United States Patent
Suzuki et al.

(10) Patent No.: US 11,086,718 B2
(45) Date of Patent: Aug. 10, 2021

(54) MEMORY SYSTEM

(71) Applicant: KIOXIA CORPORATION, Tokyo (JP)

(72) Inventors: Riki Suzuki, Yokohama Kanagawa (JP); Toshikatsu Hida, Yokohama Kanagawa (JP); Yoshihisa Kojima, Kawasaki Kanagawa (JP); Takehiko Amaki, Yokohama Kanagawa (JP); Suguru Nishikawa, Osaka Osaka (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 16/806,131

(22) Filed: Mar. 2, 2020

(65) Prior Publication Data
US 2021/0081276 A1 Mar. 18, 2021

(30) Foreign Application Priority Data
Sep. 17, 2019 (JP) .............................. JP2019-168588

(51) Int. Cl.
*G06F 11/00* (2006.01)
*G06F 11/10* (2006.01)
*G06F 3/06* (2006.01)

(52) U.S. Cl.
CPC ........ *G06F 11/1068* (2013.01); *G06F 3/0619* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,438,455 B2 | 5/2013 | Vogan et al. | |
| 8,656,252 B2 | 2/2014 | So et al. | |
| 10,573,356 B2* | 2/2020 | Cha | G11C 11/4096 |
| 2015/0019933 A1 | 1/2015 | Yamazaki et al. | |
| 2017/0177436 A1* | 6/2017 | Lee | G11C 16/26 |
| 2018/0152206 A1* | 5/2018 | Sin | G06F 11/1076 |
| 2019/0163568 A1* | 5/2019 | Liu | G06F 11/1056 |
| 2020/0135292 A1* | 4/2020 | Kim | G06F 11/106 |

OTHER PUBLICATIONS

Liu, et al., "Low Redundancy Double Error Correction Spotty Codes Combined with Gray Coding for 64 Data Bits Memories of 4-bit Multilevel Cells," 2019 IEEE International Symposium on Defect and Fault Tolerance in VLSI and Nanotechnology Systems (DFT), Noordwijk, Netherlands, 2019, pp. 1-4, (Year: 2019).*

* cited by examiner

*Primary Examiner* — Daniel F. McMahon
(74) *Attorney, Agent, or Firm* — Foley & Lardner LLP

(57) ABSTRACT

A memory system includes a nonvolatile memory, a buffer, and a controller. The buffer can temporarily store a plurality of data bits to be written to the nonvolatile memory. The controller can write the plurality of data bits, read from the buffer, to the nonvolatile memory; write a plurality of intermediate parity bits to the buffer, but not to the nonvolatile memory, wherein each of the plurality of intermediate parity bits is associated with an error correction process on each of the plurality of data bits; and write, to the nonvolatile memory, an accumulated parity bit that is an integration of the plurality of intermediate parity bits.

20 Claims, 18 Drawing Sheets

FIG. 8B

MEMORY SYSTEM

CROSS-REFERENCE TO RELATED APPLICATION(S)

This application is based upon and claims the benefit of priority from Japanese Patent Application No. 2019-168588, filed Sep. 17, 2019, the entire contents of which are incorporated herein by reference.

FIELD

Embodiments described herein relate generally to a memory system.

BACKGROUND

In a memory system having a nonvolatile memory, an error correction process is performed on data to be stored in the nonvolatile memory, using parities. At this time, it is desired to efficiently improve the reliability of data to be stored in the nonvolatile memory.

Examples of related art include JP-A-2015-018451, JP-B-5426711, and U.S. Pat. No. 8,438,455.

DESCRIPTION OF THE DRAWINGS

FIGS. 8A and 8B are views illustrating a recovery of data using the accumulated parity in the first implementation example of the embodiment.

DETAILED DESCRIPTION

Figure 1:
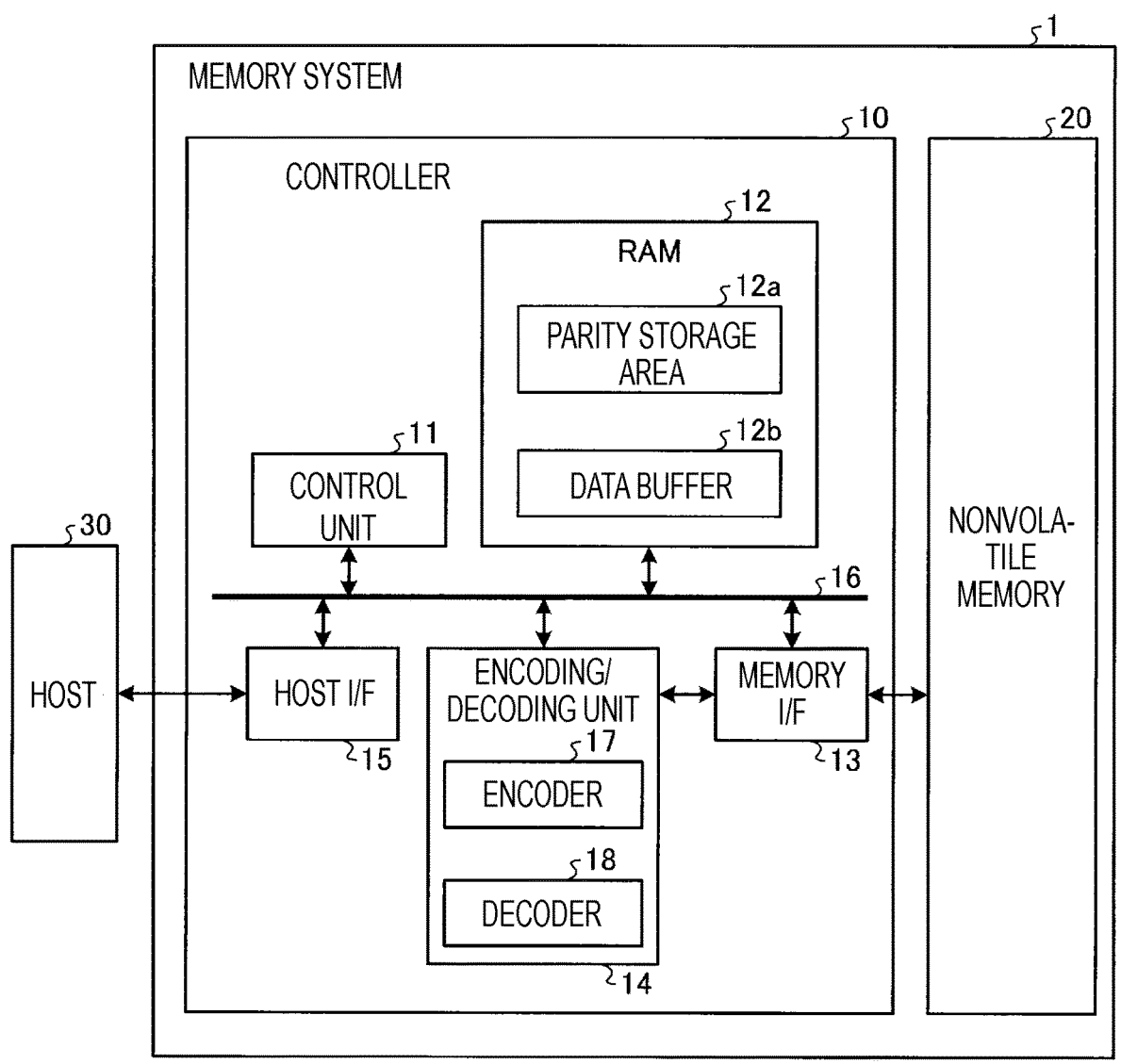
FIG. 1 is a diagram illustrating a configuration of a memory system according to an embodiment.

Embodiments provide a memory system capable of efficiently improving reliability of data to be stored in a nonvolatile memory.

In general, according to one embodiment, a memory system includes a nonvolatile memory, a buffer, and a controller. The buffer can temporarily store a plurality of data bits to be written to the nonvolatile memory. The controller can write the plurality of data bits, read from the buffer, to the nonvolatile memory; write a plurality of intermediate parity bits to the buffer, but not to the nonvolatile memory, wherein each of the plurality of intermediate parity bits is associated with an error correction process on each of the plurality of data bits; and write, to the nonvolatile memory, an accumulated parity bit that is a integration of the plurality of intermediate parity bits.

Hereinafter, the memory system according to the embodiment will be described in detail with reference to the accompanying drawings. The present disclosure is not limited by the embodiment.

Embodiment

A memory system according to an embodiment includes a nonvolatile memory. The nonvolatile memory may include a plurality of memory chips. Each memory chip includes a plurality of planes as units which are accessible in parallel. Each plane includes one or more physical blocks. Each physical block includes memory cells at intersections between a plurality of word lines and a plurality of bit lines. The plurality of memory cells correspond to the plurality of word lines and are grouped into a plurality of pages. In the nonvolatile memory, a write operation and a read operation are performed in a unit of page, and an erase process is performed in a unit of physical block.

The memory system performs an error correction process on data to be stored in the nonvolatile memory, using parities. In the memory system, failures may occur in various scales. For example, in a chip failure, all data in a memory chip are lost. Ina physical block failure, all data in a physical block are lost. In a word line failure, all data in a word line are lost. In order to deal with the failures in various scales, in a memory system, the concept of RAID (redundant arrays of inexpensive disks) may be applied to generate parities across multiple chips, so as to improve the reliability of an error correction. In a failure countermeasure using the RAID, the size of parities may significantly increase as the scale of a failure to be dealt with is large.

In the memory system, a spare area for a user data area is called an OP (over provision) area. The increase of the size of parities indicates that the OP area is consumed by the parities, and the capacity of the OP area which is usable for other purposes is reduced. That is, the increase of the size of parities indicates that an OP consumption ratio expressed in Equation 1 increases, and an OP ratio expressed in Equation 2 decreases.

OP consumption ratio=(information amount of parities)/(storage capacity of entire storage)   Equation 1

OP ratio=(capacity of OP area)/(capacity of user data area)   Equation 2

When the OP ratio decreases, a WAF (write amplification factor) expressed in Equation 3 below increases.

WAF=(total amount of data to be written to a nonvolatile memory)/(total amount of write data received from a host)   Equation 3

When the WAF increases, the nonvolatile memory may be deteriorated due to, for example, an increase in the number of times of a write operation. Further, when the OP consumption ratio increases, the minimum number of blocks necessary to realize a predetermined OP ratio may increase. When the minimum number of blocks increases, costs per unit storage capacity of data may increase in view of the entire memory system. Thus, it is desired to efficiently improve the ability to deal with an erasure error.

Meanwhile, in a write operation, a parity which is used for a data error correction process during the write operation (intermediate parity) is likely to have a higher error correction capability than that of a parity which is used for a data error correction process after the completion of write (parity at the time of data read). For example, when a data loss occurs in a predetermined storage area of a nonvolatile memory due to a word line failure at the time of the write operation, the data of the lost portion is corrected using an intermediate parity that corresponds to the predetermined storage area. A parity at the time of data read is stored (nonvolatilized) in the nonvolatile memory along with data at the time of data write. While the intermediate parity is temporarily held in the volatile memory at the time of data write, the intermediate parity is not nonvolatilized and is discarded after the data write is successful. If the intermediate parity is effectively used, it is expected to efficiently improve the ability to deal with an erasure error.

Thus, according to the present embodiment, in the memory system, an accumulated parity is obtained by integrating a plurality of intermediate parities and is nonvolatilized, so as to improve the ability to deal with an erasure error while reducing the OP consumption ratio.

Specifically, the memory system performs an encoding operation for an error correction process on data to be written to a plurality of storage areas, to generate a plurality of intermediate parities. The memory system performs a predetermined operation (e.g., exclusive OR) on the plurality of generated intermediate parities, to generate the accumulated parity. The bit length of the accumulated parity is shorter than the sum of the bit lengths of the plurality of intermediate parities. At the time of writing data to the plurality of storage areas, the memory system stores the accumulated parity in a nonvolatile memory (e.g., in the last portion of the plurality of storage areas). In a case where data of some of the plurality of storage areas that correspond to the accumulated parity are correct whereas an erasure error is occurring in another storage area that corresponds to the accumulated parity, the memory system detects that the erasure error is occurring in said another storage area. When the data are read from the plurality of storage areas that correspond to the accumulated parity, the memory system performs an encoding operation for an error correction process on the data read from the some of the plurality of storage areas that correspond to the accumulated parity, to regenerate some of the plurality of intermediate parities, which have been generated at the time of the write operation and correspond to the some of the plurality of storage areas. The memory system reads the accumulated parity, and recovers another of the intermediate parities corresponding to said another storage area, among the plurality of intermediate parities, according to the some of intermediate parities and the accumulated parity. The memory system corrects the data of said another storage area among the plurality of storage areas, using the recovered said another intermediate parity. As a result, it is possible to deal with the erasure error in said another storage area among the plurality of storage areas. That is, it is possible to deal with a large-scale erasure error, by storing in the nonvolatile memory the accumulated parity having the bit length shorter than the sum of the bit lengths of the plurality of intermediate parities. As a result, the ability to deal with an erasure error may be easily improved while reducing the OP consumption ratio.

A memory system 1 may be configured as illustrated in FIG. 1. FIG. 1 is a diagram illustrating the configuration of the memory system 1.

The memory system 1 includes a controller 10 and a nonvolatile memory 20. The memory system 1 may be connected to a host 30, and FIG. 1 represents a state where the memory system 1 is connected to the host 30. The host 30 may be an electronic device such as a personal computer or a mobile terminal.

The nonvolatile memory 20 stores data in a nonvolatile manner, and is, for example, a NAND type flash memory (hereinafter, simply referred to as a NAND memory). While descriptions herein below are made on a case where a NAND memory is used as the nonvolatile memory 20, various semiconductor memories such as a flash memory with a three-dimensional structure, a resistance random access memory (ReRAM), and a ferroelectric random access memory (FeRAM) may also be used as the nonvolatile memory 20. Further, the nonvolatile memory 20 may not be necessarily a semiconductor memory, and the present embodiment may be applied to various storage media other than the semiconductor memory.

The memory system 1 may be a memory card or the like in which the controller 10 and the nonvolatile memory 20 are included in a single package, or may be an SSD (solid state drive) or the like.

The controller 10 is a semiconductor integrated circuit including, for example, an SoC (system-on-a-chip). A portion or all of the operations of each component of the controller 10 to be described herein below may be implemented in a manner that a CPU (central processing unit) executes firmware, or may be implemented by dedicated hardware.

The controller 10 controls a write operation to the nonvolatile memory 20 according to a write request from, for example, the host 30. Further, the controller 10 controls a read operation from the nonvolatile memory 20 according to a read request from, for example, the host 30. The controller 10 includes a host interface (I/F) 15, a memory interface (I/F) 13, a control unit 11, an encoding/decoding unit 14, and a RAM 12. The host I/F 15, the memory I/F 13, the control unit 11, the encoding/decoding unit 14, and the RAM 12 are connected to each other via an internal bus 16.

The host I/F 15 performs a process in accordance with an interface standard with the host 30, and outputs, for example, a request received from the host 30 and user data to be written, to the internal bus 16. Further, the host I/F 15 transmits, for example, user data read and recovered from the nonvolatile memory 20 and a response from the control unit 11, to the host 30.

The memory I/F 13 performs a write operation to the nonvolatile memory 20, based on an instruction from the control unit 11. Further, the memory I/F 13 performs a read operation from the nonvolatile memory 20, based on an instruction from the control unit 11.

The control unit 11 comprehensively controls each component of the memory system 1. The control unit 11 is, for example, a processor. When a request is received from the host 30 via the host I/F 15, the control unit 11 performs a control corresponding to the request. For example, the control unit 11 instructs the memory I/F 13 to perform a write operation to the nonvolatile memory 20, according to a request from the host 30. Further, the control unit 11 instructs the memory I/F 13 to perform a read operation from the nonvolatile memory 20, according to an instruction from the host 30.

In addition, when a write request is received from the host 30, the control unit 11 determines a storage location of the nonvolatile memory 20 for user data stored in a data buffer 12b of the RAM 12. That is, the control unit 11 manages a write destination of the user data. An association between a logical address of the user data received from the host 30 and a physical address indicating the storage location of the nonvolatile memory 20 where the user data has been stored is stored as an address conversion table in a management information storage area (not illustrated) in the nonvolatile memory 20.

Further, when a read request is received from the host 30, the control unit 11 converts a logical address specified by the read request into a physical address by using the above-described address conversion table, and instructs the memory I/F 13 to perform a read operation from the physical address.

Figure 2:
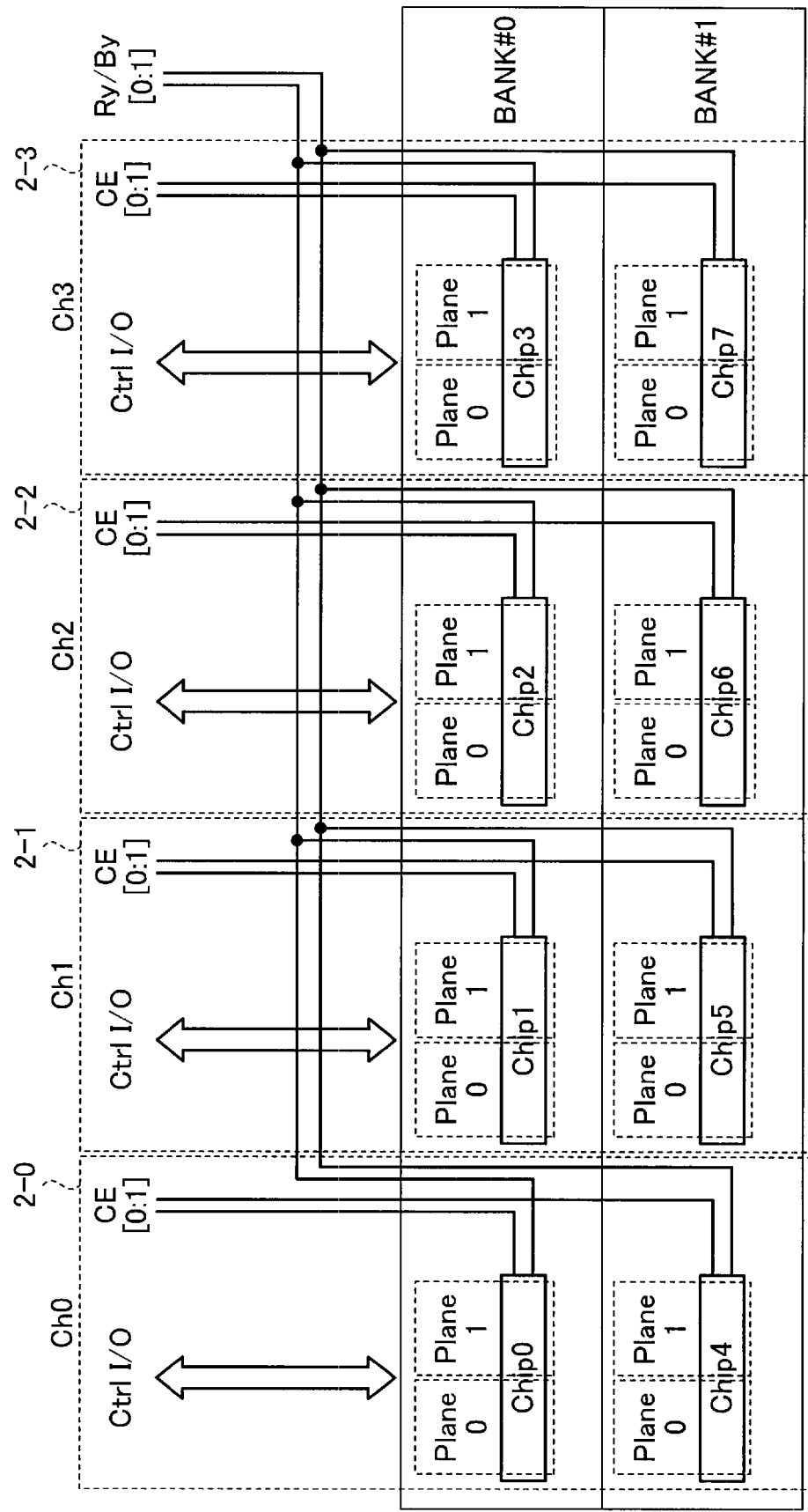
FIG. 2 is a view illustrating a configuration of channels and banks in the embodiment.

As illustrated in FIG. 2, the nonvolatile memory 20 includes a plurality of parallel operation elements 2-0 to 2-3, and the plurality of parallel operation elements 2-0 to 2-3 and the memory I/F 13 are connected to each other by a plurality of channels Ch0 to Ch3. Each of the channels Ch0 to Ch3 has a control I/O and a chip enable signal CE[0:1]. Each of the parallel operation elements 2-0 to 2-3 constitutes a plurality of banks (two banks in FIG. 2; Bank #0 and Bank #1), and each bank includes a plurality of memory chips. FIG. 2 illustrates a configuration in which Bank #0 includes four memory chips Chip0 to Chip3, and Bank #1 includes four memory chips Chip4 to Chip7.

The controller 10 individually controls each bank of the plurality of banks (Bank #0 and Bank #1) that share a control I/O signal Ctrl I/O, with two chip enable signals CE[0:1]. The CE[0] is a chip enable signal for the bank Bank #0, and the CE[1] is a chip enable signal for the bank Bank #1. Here, CE[0] indicates that the bank Bank #0 (Chip0 to Chip3) is selected, and CE[1] indicates that the bank Bank #1 (Chip4 to Chip7) is selected. A Ry/By signal Ry/By [0:1] is output to the controller 10 from each bank of the nonvolatile memory 20, to indicate whether the corresponding bank is in a busy or ready state. The Ry/By [0] is a ready/busy signal for the bank Bank #0, and Ry/By [1] is a ready/busy signal for the bank Bank #1. Here, it is assumed that Ry/By=Low indicates the busy state, and Ry/By=High indicates the ready state. In a case where each bank includes a plurality of memory chips, Ry/By signal lines and CE signal lines of the respective memory chips are connected in common.

Figure 3:
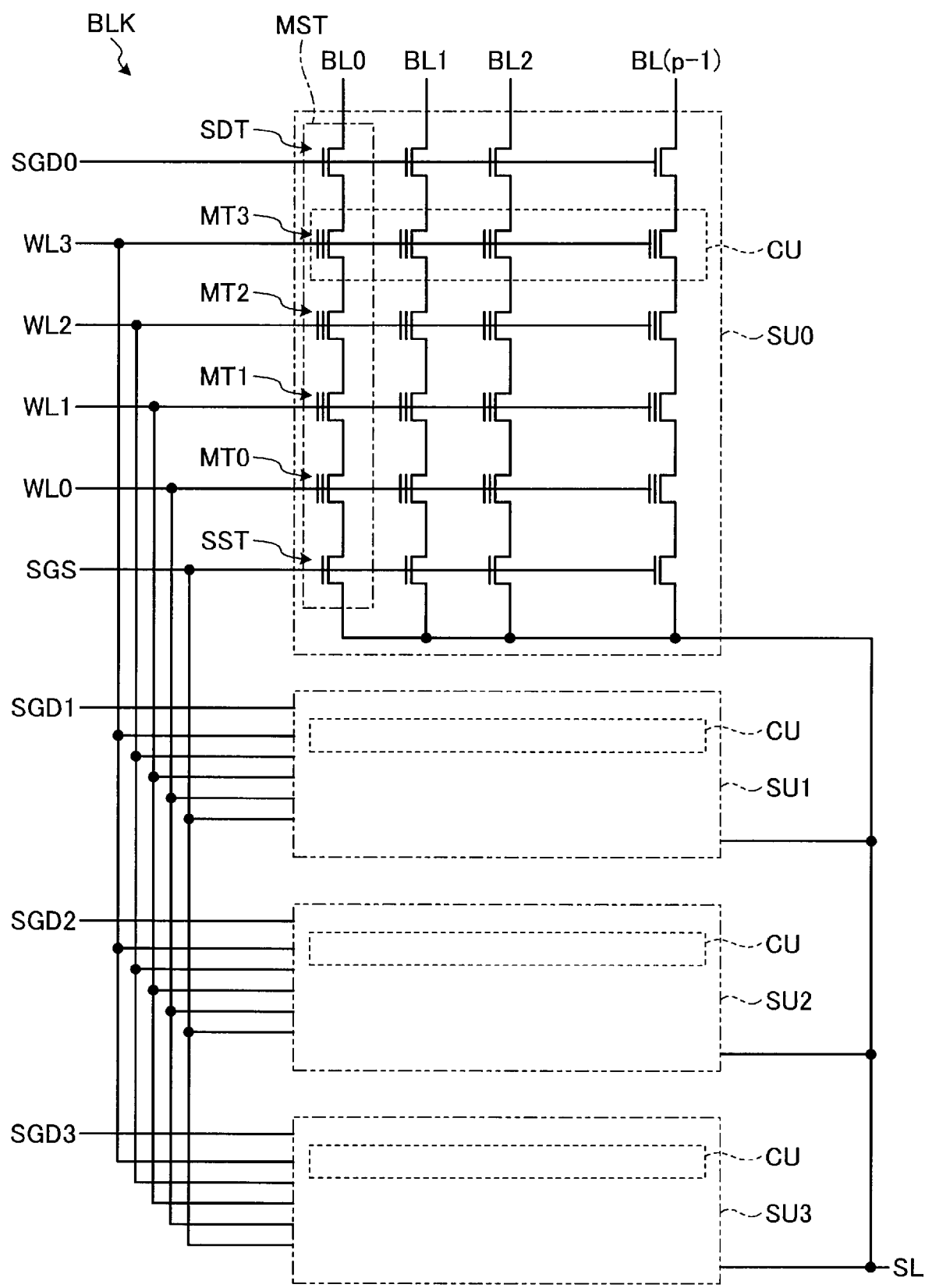
FIG. 3 is a view illustrating a configuration of a block according to the embodiment.

In each memory chip, a write operation and a read operation are performed in a unit called a page, and an erase operation is performed in a unit called a physical block including a plurality of pages. The controller 10 is able to collectively perform the erase operation in a unit of a logical block including a plurality of physical blocks. Each memory chip includes a plurality of planes (Plane0 and Plane1 in FIG. 2) as units that are accessible in parallel. Each plane includes one or more physical blocks. As illustrated in FIG. 3, each physical block includes memory cells at intersections between a plurality of word lines and a plurality of bit lines. FIG. 3 is a view illustrating the configuration of the physical block.

Each physical block BLK includes a plurality of string units SU0 to SU3. The plurality of string units SU0 to SU3 correspond to a plurality of select gate lines SGD0 to SGD3, and share a select gate line SGS. Each of the string units SU0 to SU3 functions as a driving unit in a physical block BLK. Each of the string units SU0 to SU3 is driven by the corresponding select gate line among the plurality of select gate lines SGD0 to SGD3, and the select gate line SGS.

Further, each of the string units SU0 to SU3 includes a plurality of memory strings MST.

Each memory string MST includes, for example, four memory cell transistors MT (MT0 to MT3) and select transistors SDT and SST. Each memory cell transistor MT has a control gate and a charge storage film, and stores data in a nonvolatile manner. Further, the four memory cell transistors MT (MT0 to MT3) are connected to each other in series between the source of the select transistor SDT and the drain of the select transistor SST. The number of memory cell transistors MT in the memory string MST is not limited to four.

Bit lines BL0 to BL(p−1) (referred to as BL when each bit line does not need to be identified) are connected to the memory strings MST. When the select transistor SDT is turned ON, a channel area of each memory cell transistor MT in the memory string MST becomes conductive to the bit line BL.

Word lines WL0 to WL3 (referred to as WL when each word line does not need to be identified) are connected in common to the control gates of the memory cell transistors MT throughout the memory strings MST in the respective string units SU in the physical block BLK. That is, the control gates of the memory cell transistors MT in the same row of the respective string units SU in the physical block BLK are connected to the same word line WL. That is, the string unit SU of the physical block BLK includes a plurality of cell units CU that correspond to the plurality of word lines WL, and the number of memory cell transistors MT connected to the same word line WL included in each cell unit CU is p. When each memory cell transistor MT is configured to store a 1-bit value (a single level cell (SLC) mode), the p memory cell transistors MT connected to the same word line WL (i.e., the cell unit CU) is treated as one physical page, and a data write operation and a data read operation are performed for each physical page. Note that while FIG. 3 illustrates four word lines WL (WL0 to WL3), the number of word lines WL is not limited to four.

Each memory cell transistor MT may be configured to store multiple bit values. For example, in a case where each memory cell transistor MT is able to store an n-bit value (n≥2), the storage capacity per cell unit CU is equal to the size of n physical pages. In a multi-level cell (MLC) mode in which each memory cell transistor MT stores a 2-bit value, data corresponding to two physical pages is stored in each cell unit CU. In a triple level cell (TLC) mode in which each memory cell transistor MT stores a 3-bit value, data corresponding to three physical pages is stored in each cell unit CU.

Return to FIG. 1. The RAM 12 is used as a storage for a data transfer, a management information record or a work area. As for the RAM 12, for example, a general-purpose memory such as a static random access memory (SRAM) or a dynamic random access memory (DRAM) may be used.

The RAM 12 includes a parity storage area 12a and a data buffer 12b. The parity storage area 12a temporarily stores a parity to be used for an error correction process. The parity storage area 12a stores parities that are used for a data error correction process during write (i.e., intermediate parities) or an accumulated parity that is obtained by integrating the plurality of intermediate parities. The data buffer 12b temporarily stores user data received by the controller 10 from the host 30 until the user data is stored in the nonvolatile memory 20. In addition, the data buffer 12b temporarily stores user data read and recovered from the nonvolatile memory 20 until the read and recovered user data is transmitted to the host 30.

User data transmitted from the host 30 is transferred to the internal bus 16, and temporarily stored in the data buffer 12b. The encoding/decoding unit 14 encodes the user data to be stored in the nonvolatile memory 20, to generate a codeword including the user data and a parity. Further, the encoding/decoding unit 14 decodes the codeword read from the nonvolatile memory 20, to recover the user data. In addition, the data encoded by the encoding/decoding unit 14 may include, for example, control data that is used in the controller 10, in addition to the user data.

When data is written to the nonvolatile memory 20, an encoder 17 in the encoding/decoding unit 14 performs an encoding operation on the data, based on an instruction from the control unit 11.

For example, when data to be stored in first to (N−1)th (N is an integer of more than or equal to 2) storage areas of the nonvolatile memory 20 are stored in the data buffer 12b, the encoder 17 performs an encoding operation on each of the data to be stored in the first to (N−1)th storage areas, generates intermediate parities, and stores the intermediate parities in the parity storage area 12a, based on an instruction from the control unit 11. In a case where the nonvolatile memory 20 includes a plurality of memory chips, each of N storage areas is a storage area that is accessible from the controller 10, and may be a storage area that spans the plurality of memory chips. The memory I/F 13 stores the data on the data buffer 12b, into the first to (N−1)th storage areas of the nonvolatile memory 20. When data to be stored in an Nth storage area of the nonvolatile memory 20 is stored on the data buffer 12b, the encoder 17 performs an encoding operation on the data to be stored in the Nth storage area and generates an intermediate parity, based on an instruction from the control unit 11. The encoder 17 integrates the first to Nth intermediate parities to generate an accumulated parity. That is, the encoder 17 performs a predetermined operation on the first to Nth intermediate parities to generate the accumulated parity. The encoder 17 supplies the data on the data buffer 12b and the accumulated parity to the memory I/F 13. The memory I/F 13 stores the data and the accumulated parity in the Nth storage area of the nonvolatile memory 20.

Figure 4:
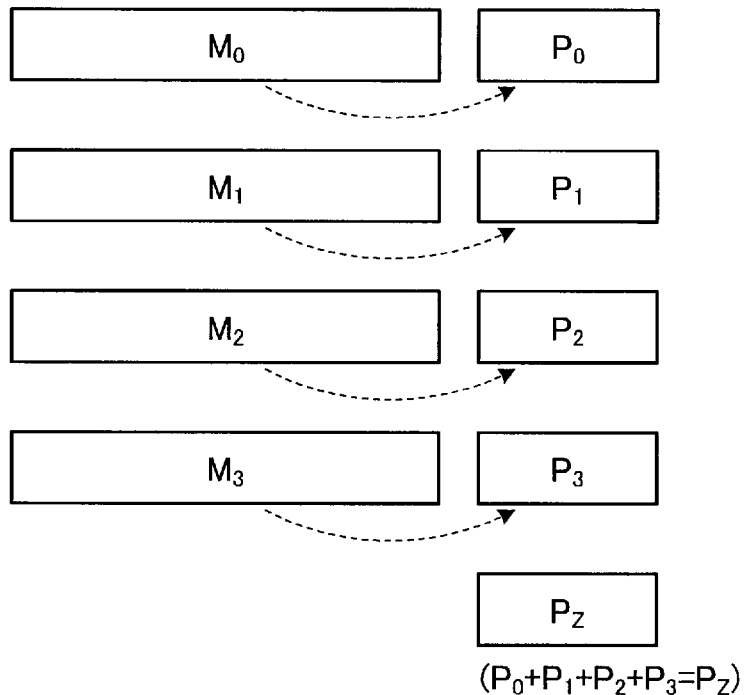
FIG. 4 is a view illustrating a generation of the accumulated parity in the embodiment.

For example, when N=4, the accumulated parity may be generated as illustrated in FIG. 4. FIG. 4 is a view illustrating the generation of the accumulated parity.

When data to be stored in first to third storage areas $M_0$ to $M_2$ among four storage areas $M_0$ to $M_3$ of the nonvolatile memory 20 are stored on the data buffer 12b, the encoder 17 performs an encoding operation on each of the data to be stored in the first to third storage areas $M_0$ to $M_2$ and generates intermediate parities $P_0$ to $P_2$, based on an instruction from the control unit 11.

The encoding operation for generating each of the intermediate parities $P_0$ to $P_3$ may be, for example, the Reed-Solomon type encoding operation.

The memory I/F 13 stores the data on the data buffer 12b in the first to third storage areas $M_0$ to $M_2$ of the nonvolatile memory 20. When data to be stored in the fourth storage area $M_3$ of the nonvolatile memory 20 is stored on the data buffer 12b, the encoder 17 performs an encoding operation on the data to be stored in the fourth storage area $M_3$ and generates an intermediate parity $P_3$, based on an instruction from the control unit 11. The encoder 17 integrates the first to fourth intermediate parities $P_0$ to $P_3$ to generate an accumulated parity. That is, the encoder 17 performs a predetermined operation on the first to fourth intermediate parities $P_0$ to $P_3$ to generate the accumulated parity $P_z$.

The predetermined operation for generating the accumulated parity $P_z$ may be, for example, exclusive OR. When the predetermined operation is exclusive OR, the bit length of the accumulated parity $P_z$ is equal to the bit length of each of the intermediate parities $P_0$ to $P_3$. The predetermined operation for generating the accumulated parity $P_z$ may be, for example, the BCH (Bose-Chaudhuri-Hocquechem) encoding operation. In a case where the predetermined operation is the BCH type encoding operation, the bit length of the accumulated parity $P_z$ is longer than the bit length of each of the intermediate parities $P_0$ to $P_3$. The extent of the increase in bit length depends on an encoding ratio of a code (BCH code) generated by the BCH type encoding operation. The predetermined operation for generating the accumulated parity $P_z$ may be the Reed-Solomon type encoding operation. In a case where the predetermined operation is the Reed-Solomon type encoding operation, the bit length of the accumulated parity $P_z$ is longer than the bit length of each of the intermediate parities $P_0$ to $P_3$. The extent of the increase in bit length depends on the erasure correction capability of a code (RS code) generated by the Reed-Solomon type encoding operation.

The encoder 17 supplies the data on the data buffer 12b and the accumulated parity $P_z$ to the memory I/F 13. The memory I/F 13 stores the data and the accumulated parity $P_z$ in the fourth storage area $M_3$ of the nonvolatile memory 20. In addition, for example, when a data loss occurs in the storage area $M_1$ due to a word line failure before the accumulated parity $P_z$ is written to the nonvolatile memory 20, a decoder 18 corrects data of the lost portion in the storage area $M_1$, by using the intermediate parity $P_1$ that corresponds to the storage area $M_1$.

When data is read from the nonvolatile memory 20, the decoder 18 in the encoding/decoding unit 14 reads the data and the accumulated parity, detects an error in the data, corrects the error in the data by using the accumulated parity, based on an instruction from the control unit 11.

For example, when an erasure error is occurring in a Kth storage area (K is an integer that satisfies among the N storage areas that correspond to the accumulated parity, and no erasure error is occurring in the other storage areas among the N storage areas, the decoder 18 detects that the erasure error is occurring in the Kth storage area, based on an instruction from the control unit 11. The decoder 18 performs an encoding operation for an error correction process on data read from the storage areas other than the Kth storage area, among the N storage areas. The decoder 18 regenerates the intermediate parities, other than the intermediate parity of the Kth storage area, which were generated at the time of write operation but were not stored in the nonvolatile memory 20, among the N intermediate parities. The decoder 18 reads the accumulated parity from the nonvolatile memory 20, and recovers the intermediate parity of the Kth storage area among the N intermediate parities according to the intermediate parities other than the intermediate parity of the Kth storage area, and the accumulated parity. The decoder 18 corrects the data of the Kth storage area of the N storage areas, by using the recovered intermediate parity of the Kth storage area. As a result, it is possible to deal with the erasure error in the Kth storage area among the N storage areas. That is, it is possible to deal with a large-scale erasure error by storing in the nonvolatile memory 20 the accumulated parity having the bit length shorter than the sum of the bit lengths of the N intermediate parities, so that the ability to deal with an erasure error may be improved while reducing the OP consumption ratio.

Figure 5:
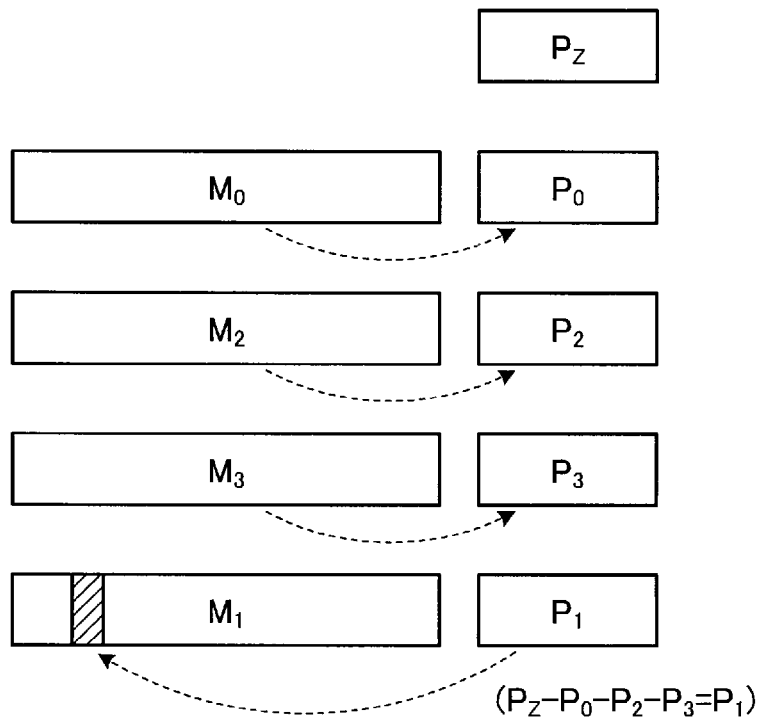
FIG. 5 is a view illustrating a recovery of data using an accumulated parity according to the embodiment.

For example, when N=4, the recovery of data using an accumulated parity may be performed as illustrated in FIG. 5.

Descriptions will be made assuming a case where among data stored in four storage areas $M_0$ to $M_3$ that correspond to an accumulated parity $P_z$, data of the storage areas $M_0$, $M_2$ and $M_3$ are correct whereas an erasure error is occurring in the obliquely hatched portion of the storage area $M_1$. Based on an instruction from the control unit 11, the decoder 18 detects that the erasure error is occurring in the obliquely hatched portion of the storage area $M_1$. The decoder 18 performs an encoding operation for an error correction process on the data read from the storage areas $M_0$, $M_2$ and $M_3$. The decoder 18 regenerates the intermediate parities $P_0$, $P_2$ and $P_3$ that were generated at the time of write operation but were not stored in the nonvolatile memory 20. The decoder 18 reads the accumulated parity $P_z$ from the nonvolatile memory 20, and recovers the intermediate parity $P_1$ according to the intermediate parities $P_0$, $P_2$ and $P_3$ and the accumulated parity $P_2$. The decoder 18 may recover the intermediate parity $P_1$ by performing an inverse operation of the predetermined operation that was performed at the time of generating the accumulated parity $P_2$. The decoder 18 corrects the data of the storage area $M_1$ using the recovered intermediate parity $P_1$. As a result, it is possible to deal with the erasure error in the storage area $M_1$ of the four storage areas. That is, it is possible to deal with a large-scale error by storing in the nonvolatile memory 20 the accumulated parity $P_z$ having the bit length shorter than the sum of the bit lengths of the four intermediate parities $P_0$ to $P_3$, so that the ability to deal with an erasure error may be improved while reducing the OP consumption ratio.

In the memory system 1, it may be possible to predict a scale of an erasure error that is likely to occur, to some extent. Thus, the accumulated parity may be implemented in a manner that a plurality of storage areas that correspond to the accumulated parity are determined according to the scale of an erasure error that is likely to occur.

Figure 6:
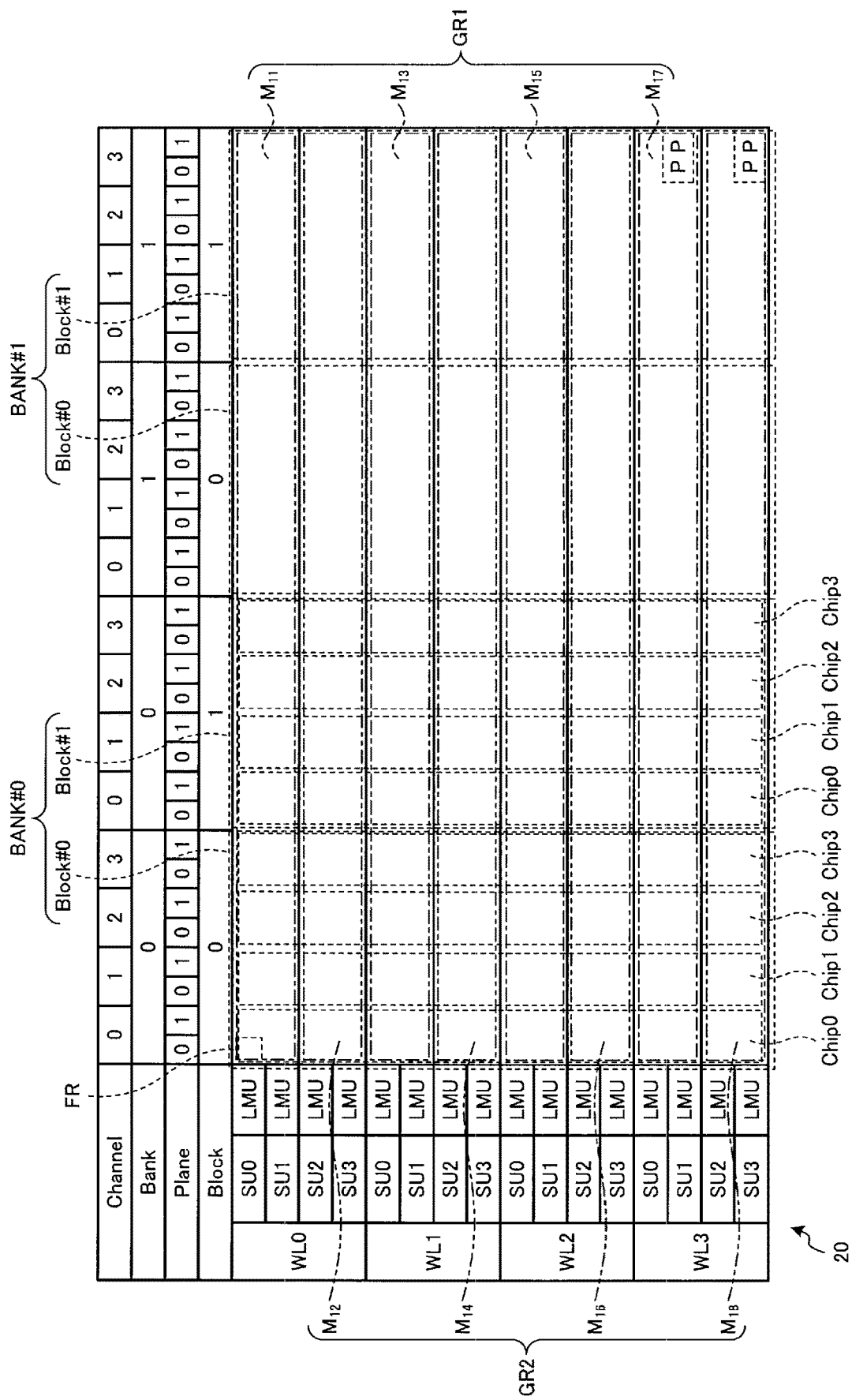
FIG. 6 is a view illustrating a configuration of a nonvolatile memory in a first implementation example (a one-word-line-failure countermeasure) of the embodiment.
Figure 7A:
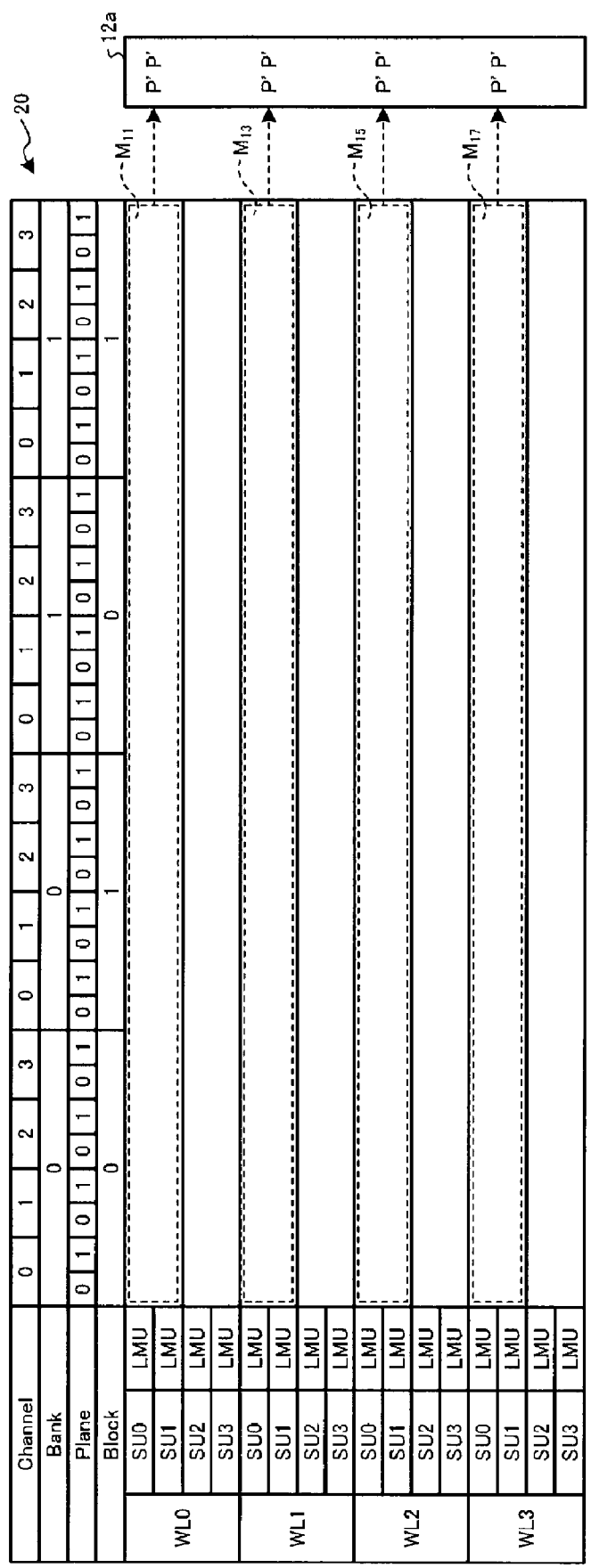
FIGS. 7A and 7B are views illustrating a generation of an accumulated parity in the first implementation example of the embodiment.
Figure 7B:
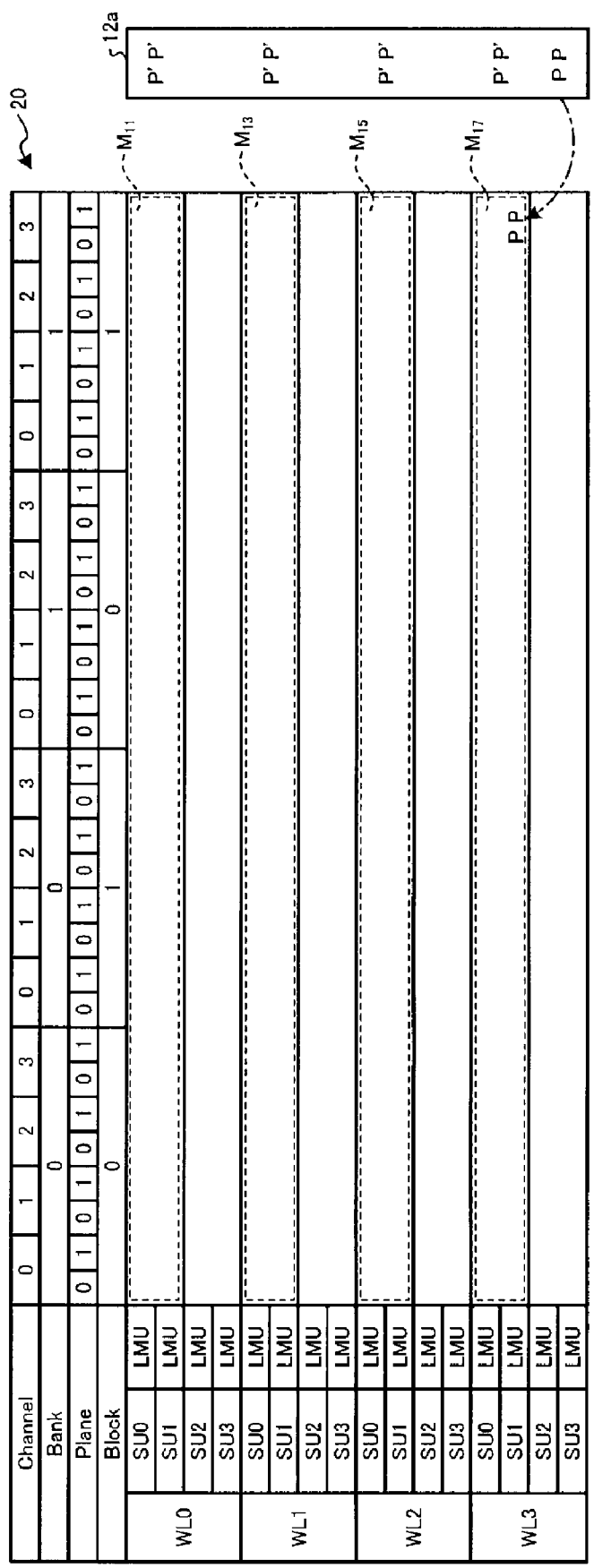
Figure 8A:
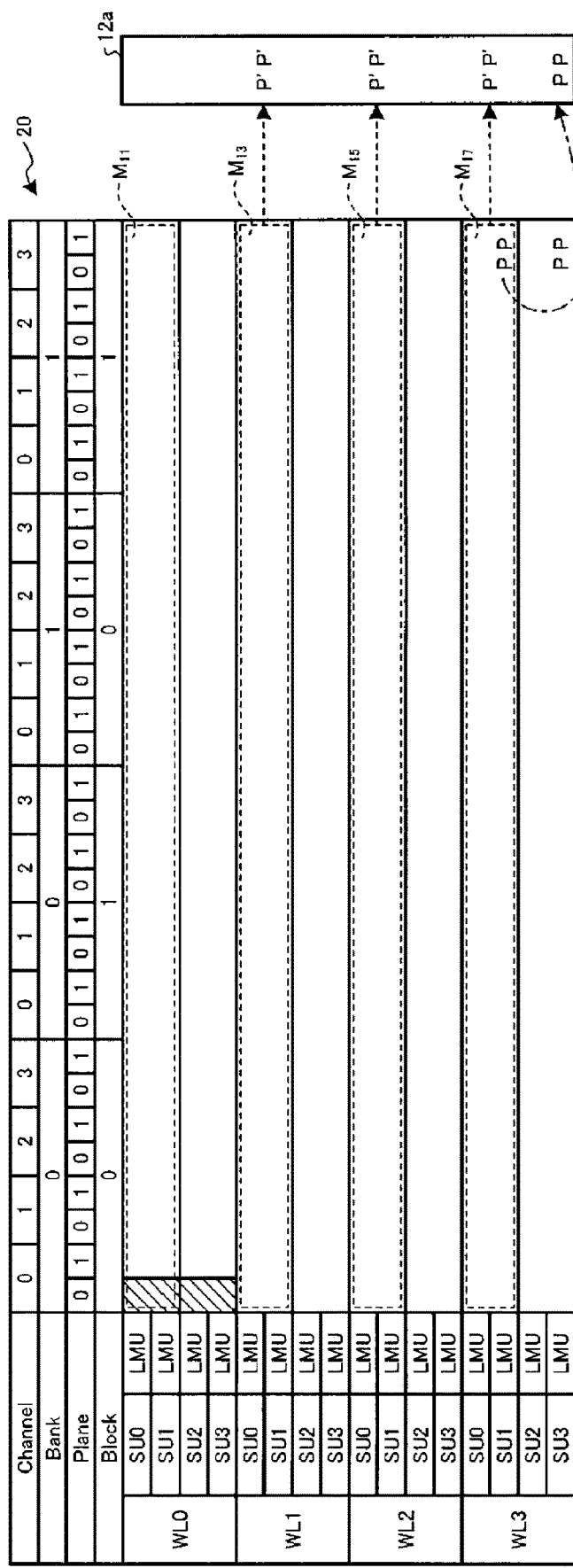
Figure 8B:
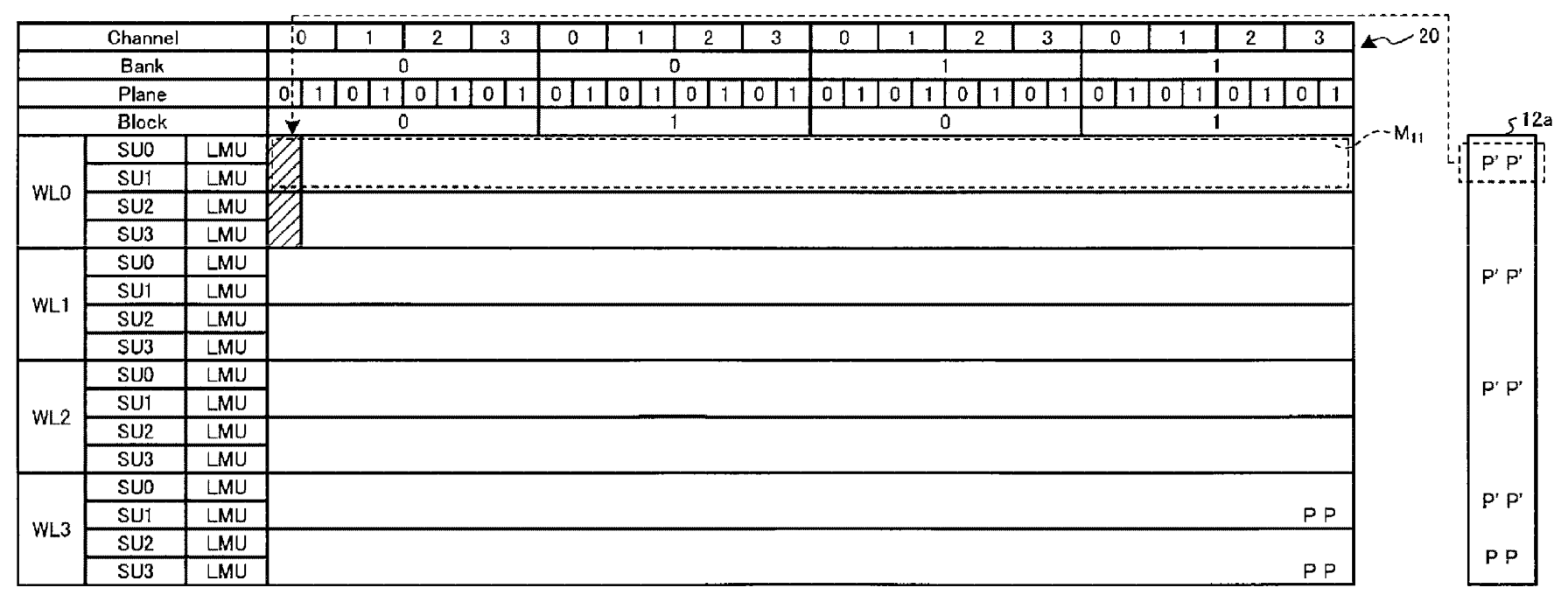

For example, when the scale of an erasure error that is likely to occur is one word line, the accumulated parity may be implemented as illustrated in FIGS. 6 to 8. FIG. 6 is a view illustrating a configuration of the nonvolatile memory 20 in a first implementation example (a one-word-line-failure countermeasure) of the embodiment. FIGS. 7A and 7B are views illustrating the generation of an accumulated parity in the first implementation example of the embodiment. FIGS. 8A and 8B are views illustrating the recovery of data using an accumulated parity in the first implementation example of the embodiment.

FIG. 6 represents the entire storage areas of the nonvolatile memory 20. FIG. 6 illustrates a configuration where the nonvolatile memory 20 includes two banks Banks #0 and Bank #1 each connected to the controller 10 at the four channels Ch0 to Ch3. The bank Bank #0 includes a plurality of chips (e.g., the four chips Chip0 to Chip3) that correspond to a plurality of channels Ch (e.g., the four channels Ch0 to Ch3) respectively, and each chip includes two planes Plane #0 and Plane #1. Each plane includes two blocks (two physical blocks) Block #0 and Block #1. FIG. 6 illustrates a state where the inside of the plane Plan #0 is separated into Block #0 (in Plane #0) and Block #1 (in Plane #0), and the inside of the plane Plan #1 is separated into Block #0 (in Plane #1) and Block #1 (in Plane #1).

The chip Chip0 corresponds to the channel Ch0, and is connected to the controller 10 via the channel Ch0 (see FIG. 2). The chip Chip0 includes Block #0 (in Plane #0), Block #0 (in Plane #1), Block #1 (in Plane #0), and Block #1 (in Plane #1). FIG. 6 illustrates a state where first sets each including Block #0 (in Plane #0) and Block #0 (in Plane #1) are adjacent to each other, and second sets each including Block #1 (in Plane #0) and Block #1 (in Plane #1) are adjacent to each other, such that the first and second sets are separated from each other. Similarly, the chip Chip3 corresponds to the channel Ch3, and is connected to the controller 10 via the channel Ch3 (see FIG. 2). The chip Chip3 includes Block #0 (in Plane #0) of the plane Plane #0, Block #0 (in Plane #1) of the plane Plane #1, Block #1 (in Plane #0) of the plane Plane #0, and Block #1 (in Plane #1) of the plane Plane #1. FIG. 6 illustrates a state where first sets each including Block #0 (in Plane #0) and Block #0 (in Plane #1) are adjacent to each other, and second sets each including Block #1 (in Plane #0) and Block #1 (in Plane #1) are adjacent to each other, such that the first and second sets are separate from each other.

Further, FIG. 6 illustrates an example where each plane has two physical blocks, each physical block has memory cell groups corresponding to four word lines WL, and the memory cell group corresponding to each word line WL has four string units SU0 to SU3. Each of the memory cell group connected to the word line WL0 in the string unit SU0, the memory cell group connected to the word line WL0 in the string unit SU1, . . . , and the memory cell group connected to the word line WL3 in the string unit SU3 corresponds to the cell unit CU illustrated in FIG. 3. Further, in FIG. 6, a unit of storage capacity determined by a combination of one plane and one cell unit is defined as a frame FR, and FIG. 6 illustrates an example where an error correction capability of an intermediate parity is two frames or lower.

FIG. 6 illustrates an example where storage areas are determined in accordance with two accumulated parities, for the entire storage areas of the nonvolatile memory 20. The entire storage areas of the nonvolatile memory 20 include a plurality of storage areas $M_{11}$, $M_{13}$, $M_{15}$, and $M_{17}$ that correspond to a first accumulated parity, and a plurality of storage areas $M_{12}$, $M_{14}$, $M_{16}$, and $M_{18}$ that correspond to a second accumulated parity. A storage area group including the plurality of storage areas $M_{11}$, $M_{13}$, $M_{15}$, and $M_{17}$ is defined as GR1. The storage area $M_{11}$ includes the memory cell groups of the two cell units CU0 and CU1, per physical block, that correspond to the word line WL0, in the amount proportional to the two banks Bank #0 and Bank #1, the two physical blocks Block #0 and Block #1, and the four channels Ch0 to Ch3. Here, the memory cell group that is provided in the string unit SU0 and connected to the word line WL0 corresponds to the cell unit CU0. Further, the memory cell group that is provided in the string unit SU1 and connected to the word line WL0 corresponds to the cell unit CU1. The storage area $M_{11}$ includes 64 frames. The same applies to the other storage areas $M_{13}$, $M_{15}$, and $M_{17}$. A storage area group including the plurality of storage areas $M_{12}$, $M_{14}$, $M_{16}$, and $M_{18}$ is defined as GR2. The storage area $M_{12}$ includes the memory cell groups of the two cell units CU2 and CU3, per physical block, that correspond to the word line WL0, in the amount proportional to the two banks Bank #0 and Bank #1, and the two physical blocks Block #0 and Block #1, and the four channels Ch0 to Ch3. Here, the memory cell group that is provided in the string unit SU2 and connected to the word line WL0 corresponds to the cell unit CU2. Further, the memory cell group that is provided in the string unit SU3 and connected to the word line WL0 corresponds to the cell unit CU3. The storage area $M_{12}$ includes 64 frames. The same applies to the other storage areas $M_{14}$, $M_{16}$, and $M_{18}$. The storage area group GR1 corresponds to the first accumulated parity, and the storage area group GR2 corresponds to the second accumulated parity.

The plurality of storage areas $M_{11}$, $M_{13}$, $M_{15}$, and $M_{17}$ of the storage area group GR1 and the plurality of storage areas $M_{12}$, $M_{14}$, $M_{16}$, and $M_{18}$ of the storage area group GR2 are arranged to be physically dispersed from each other in the nonvolatile memory 20. The storage areas $M_{13}$, $M_{15}$, and $M_{17}$ are arranged to be physically dispersed from each other among the storage areas $M_{12}$, $M_{14}$, $M_{16}$, and $M_{18}$. The storage areas $M_{12}$, $M_{14}$, and $M_{16}$ are arranged to be physically dispersed from each other among the storage areas $M_{11}$, $M_{13}$, $M_{15}$, and $M_{17}$.

As a result, when an erasure error occurs in a plurality of adjacent frames, the number of storage areas of each storage area group that are affected by the erasure error may be reduced.

In the configuration illustrated in FIG. 6, the generation of the accumulated parity may be performed as illustrated in FIGS. 7A and 7B. FIGS. 7A and 7B are views illustrating the generation of the accumulated parity in the first implementation example.

For example, for the storage area group GR1, as illustrated in FIG. 7A, when data to be stored into the storage areas $M_{11}$, $M_{13}$, $M_{15}$, and $M_{17}$ are stored on the data buffer 12b, the encoder 17 performs an encoding operation on each of the data to be stored into the storage areas $M_{11}$, $M_{13}$, $M_{15}$, and $M_{17}$, and generates intermediate parities P'P', based on an instruction from the control unit 11. The encoding operation is, for example, a Reed-Solomon encoding operation, and the notation of P'P' (two P's are noted consecutively) for the intermediate parity indicates that the intermediate parity has a bit length corresponding to two frames. The encoder 17 stores the generated intermediate parities P'P' in the parity storage area 12a. Further, the memory I/F 13 stores the data on the data buffer 12b into the storage areas $M_{11}$, $M_{13}$, and $M_{15}$.

Subsequently, as illustrated in FIG. 7B, the encoder 17 integrates the intermediate parities P'P' of the storage areas $M_{11}$, $M_{13}$, $M_{15}$, and $M_{17}$, and generates an accumulated parity PP. The encoder 17 performs a predetermined operation on the intermediate parities P'P' of the storage areas $M_{11}$, $M_{13}$, $M_{15}$, and $M_{17}$ to generate the accumulated parity PP. The predetermined operation is, for example, exclusive OR, and the notation of PP (two Ps are noted consecutively) for the accumulated parity indicates that the accumulated parity PP has a bit length corresponding to two frames. The encoder 17 stores the generated accumulated parity PP in the parity storage area 12a. The encoder 17 supplies the data on the data buffer 12b and the accumulated parity PP on the parity storage area 12a, to the memory I/F 13. The memory I/F 13 stores the data and the accumulated parity PP in the storage area $M_{17}$ of the nonvolatile memory 20. The accumulated parity PP may be stored in the last portion (e.g., the last two frames) of the storage area $M_{17}$.

Then, the control unit 11 discards the accumulated parity PP and the intermediate parities P'P' of the respective storage areas $M_{11}$, $M_{13}$, $M_{15}$, and $M_{17}$, which are stored in the parity storage area 12a.

In addition, the generation of an accumulated parity for the storage area group GR2 may be performed in the same manner as illustrated in FIGS. 7A and 7B.

In the configuration illustrated in FIG. 6, the recovery of data using an accumulated parity may be performed as illustrated in FIGS. 8A and 8B. FIGS. 8A and 8B are views illustrating the recovery of data using the accumulated parity in the first implementation example.

For example, descriptions will be made assuming a case where an erasure error occurs in one word line indicated by an oblique hatching in FIG. 8A.

At this time, for the storage area group GR1, the data of the storage areas $M_{13}$, $M_{15}$, and $M_{17}$ among the storage areas $M_{11}$, $M_{13}$, $M_{15}$, and $M_{17}$ corresponding to the accumulated parity PP are correct whereas an erasure error is occurring in the oblique hatched portion of the storage area $M_{11}$. Based on an instruction from the control unit 11, the decoder 18 detects that the erasure error is occurring in the oblique hatched portion of the storage area $M_{11}$.

As illustrated in FIG. 8A, the decoder 18 performs an encoding operation for an error correction process on the data read from the storage areas $M_{13}$, $M_{15}$, and $M_{17}$ that are not affected by the erasure error, and regenerates the intermediate parities P'P' of the storage areas $M_{13}$, $M_{15}$, and $M_{17}$, respectively. The decoder 18 reads the accumulated parity PP from the storage area $M_{17}$.

As illustrated in FIG. 8B, the decoder 18 recovers the intermediate parity P'P' of the storage area $M_{11}$, according to the intermediate parities P'P' of the storage areas $M_{13}$, $M_{15}$, and $M_{17}$ and the accumulated parity PP. The decoder 18 recovers the intermediate parity P'P' of the storage area $M_{11}$, by performing an inverse operation of the predetermined operation that was performed at the time of generating the accumulated parity PP. The decoder 18 corrects the data of the obliquely hatched portion of the storage area $M_{11}$, using the recovered intermediate parity P'P'. As a result, it is possible to deal with the erasure error in the storage area $M_{11}$ among the plurality of storage areas $M_{11}$, $M_{13}$, $M_{15}$, and $M_{17}$.

In addition, the correction of data using an accumulated parity for the storage area group GR2 may be performed in the same manner as illustrated in FIGS. 8A and 8B.

That is, it is possible to deal with a large-scale erasure error, by storing in the nonvolatile memory 20 the accumulated parity PP having the bit length shorter than the sum of the bit lengths of the intermediate parities P'P' of the plurality of storage areas, so that the ability to deal with an erasure error may be improved while reducing the OP consumption ratio.

In FIGS. 7A, 7B, 8A, and 8B, the bit length of the accumulated parity is two frames, and the storage capacity of each of the storage area groups GR1 and GR2 is calculated as 32×2×4=256 frames. Thus, the OP consumption ratio of each of the storage area groups GR1 and GR2 may be expressed in Equation 4 below.

$$\text{OP consumption ratio} = 2/256 = 0.78125(\%) \qquad \text{Equation 4}$$

As described above, in the first implementation example, it is possible to perform a one-word-line-failure countermeasure using an accumulated parity, and the OP consumption ratio for the entire storage areas of the nonvolatile memory 20 may be reduced to the value expressed in Equation 4.

Figure 9:
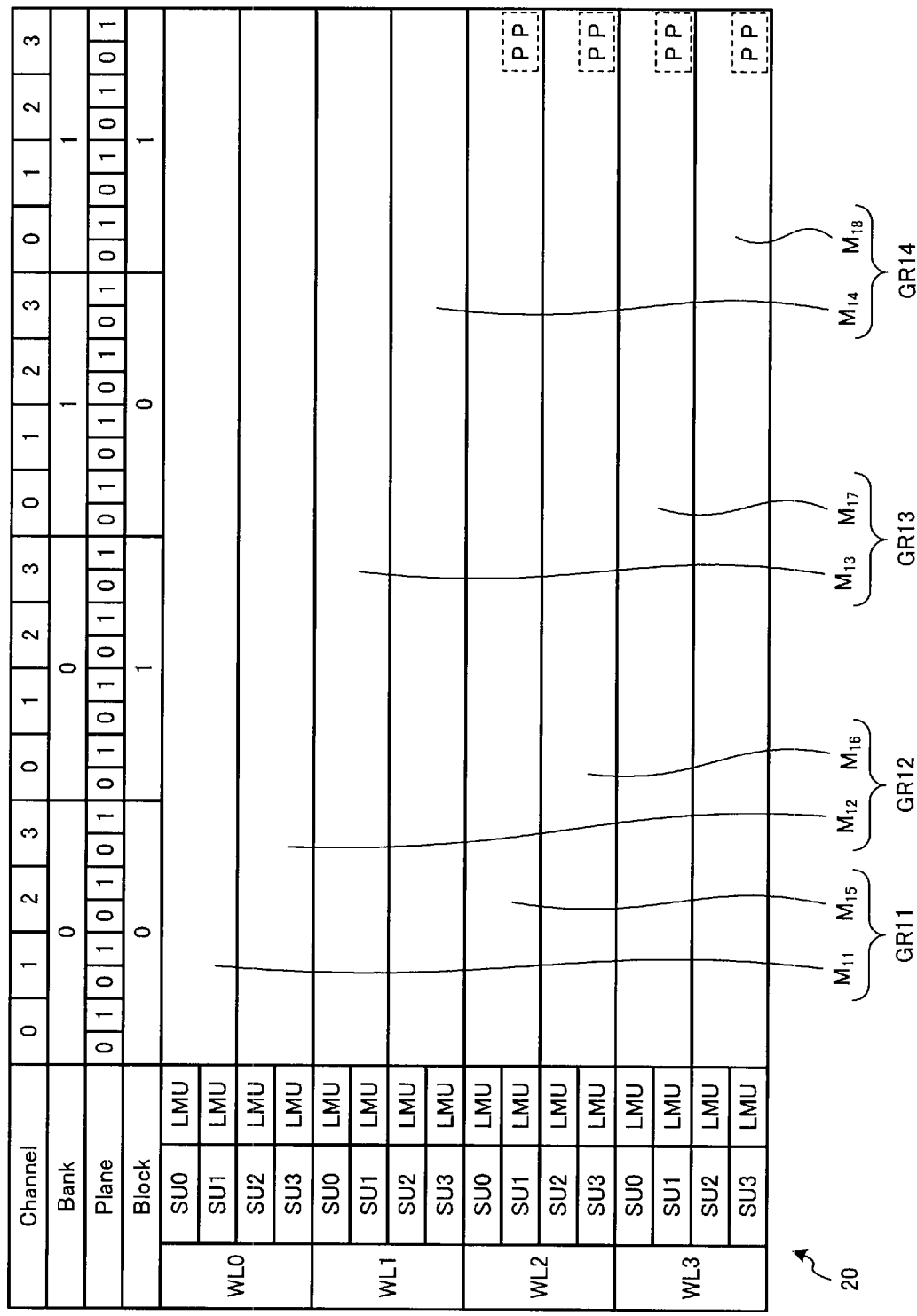
FIG. 9 is a view illustrating a configuration of a nonvolatile memory in a second implementation example (a two-word-line-failure countermeasure) of the embodiment.
Figure 10A:
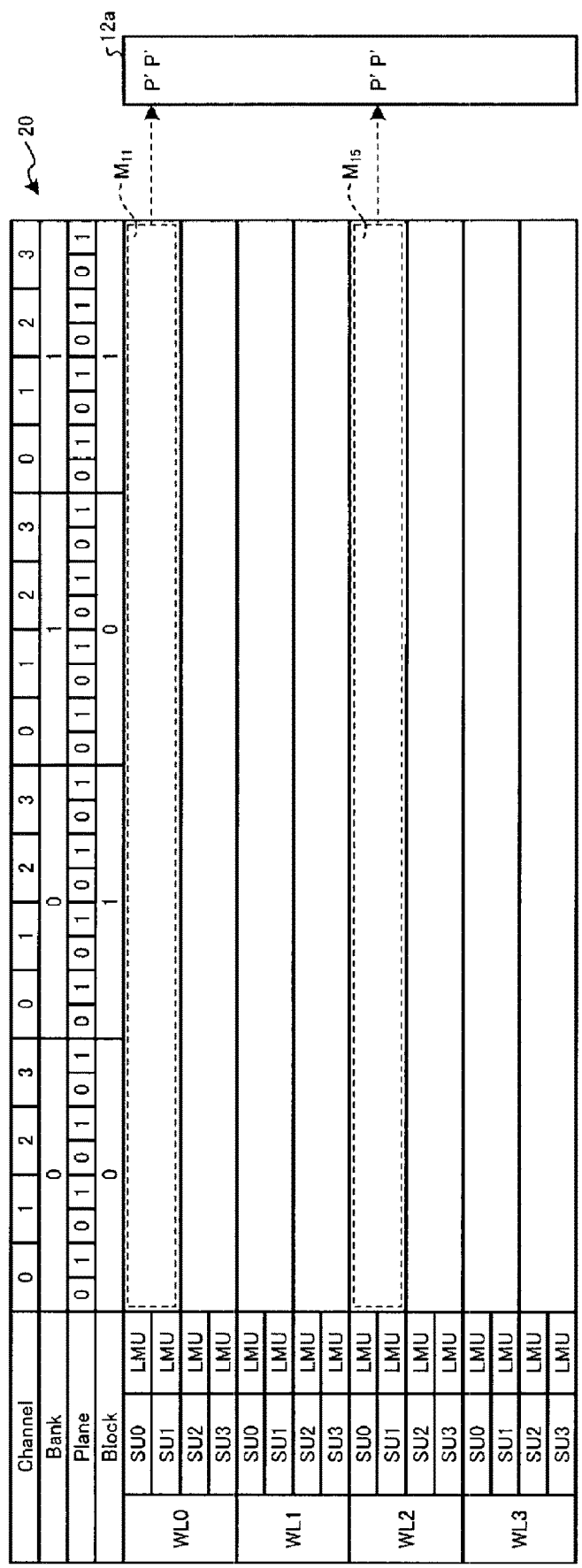
FIGS. 10A and 10B are views illustrating a generation of an accumulated parity in the second implementation example of the embodiment.
Figure 10B:
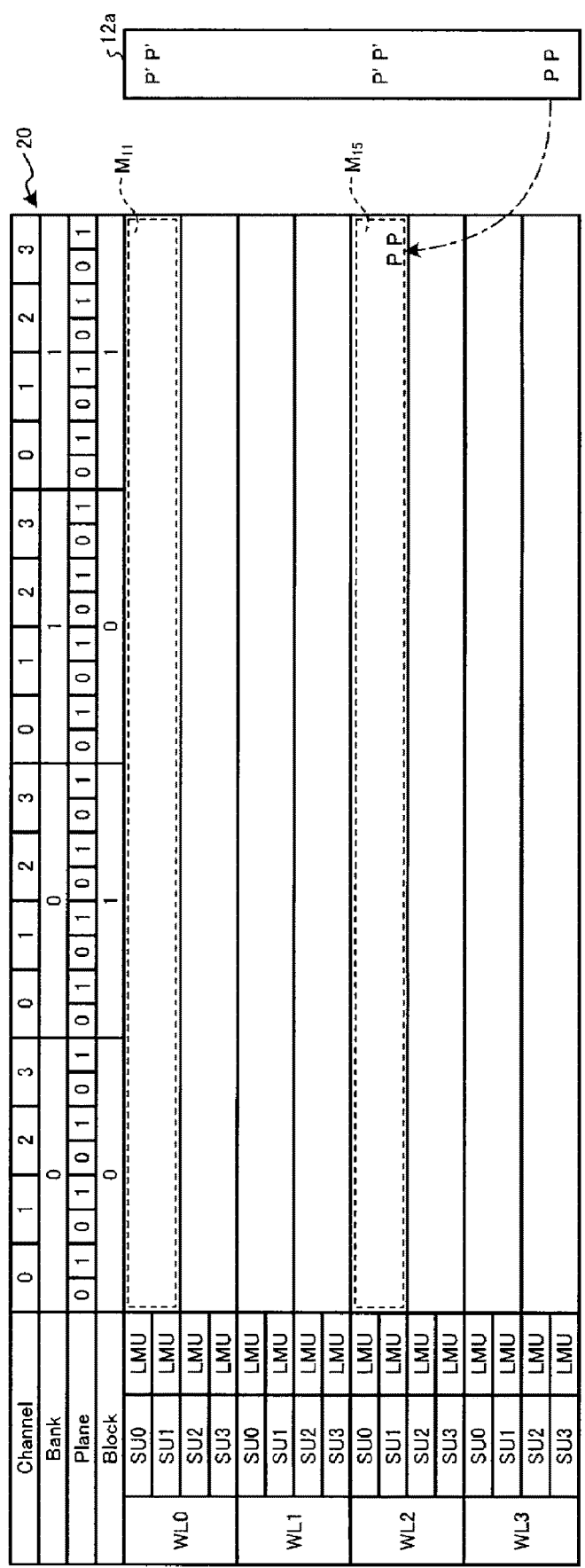
Figure 11A:
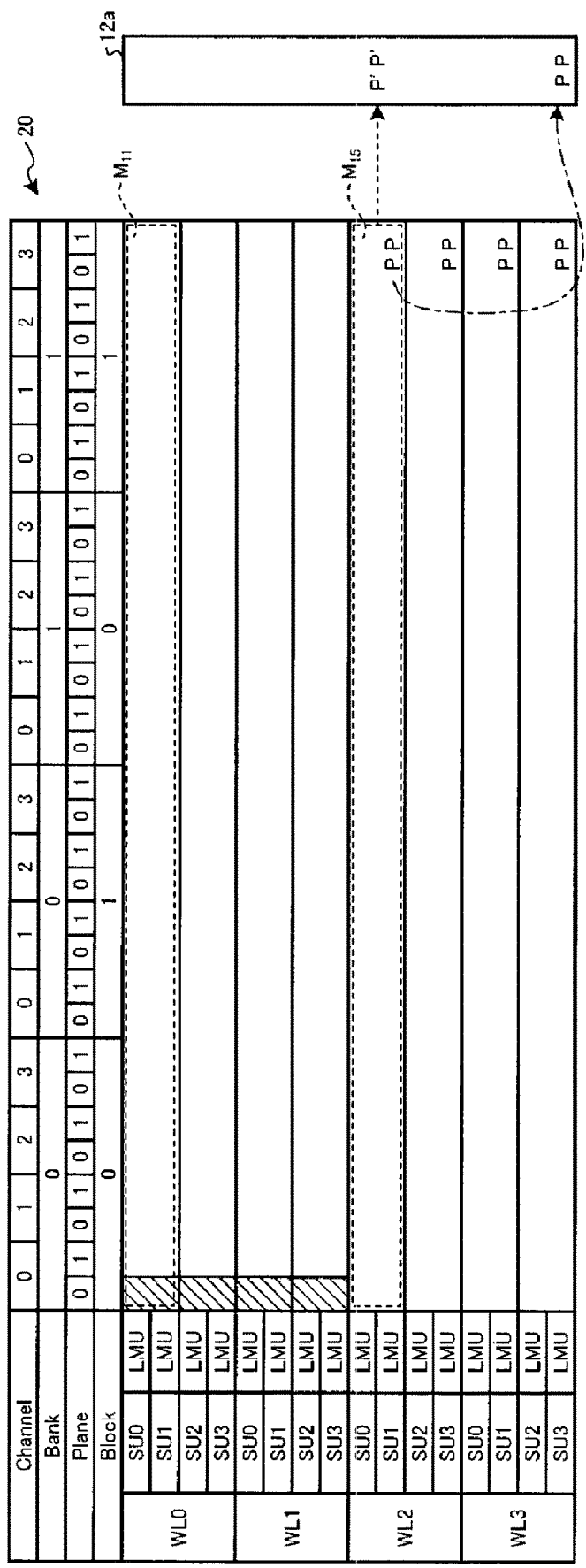
FIGS. 11A and 11B are views illustrating a recovery of data using the accumulated parity in the second implementation example of the embodiment.
Figure 11B:
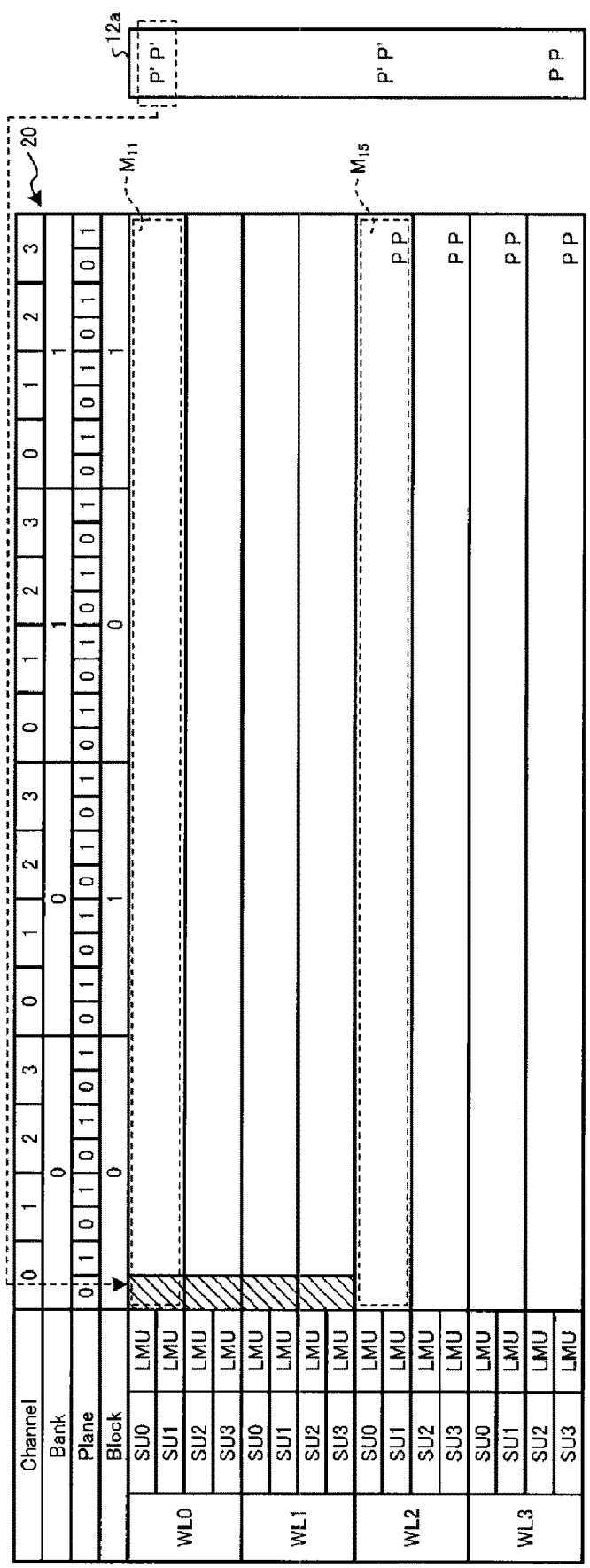

When a scale of an erasure error that is likely to occur is, for example, two word lines, an accumulated parity may be implemented as illustrated in FIGS. 9, 10A, 10B, 11A, and 11B. FIG. 9 is a view illustrating a configuration of the nonvolatile memory 20 in a second implementation example (a two-word-line-failure countermeasure) of the embodiment. FIGS. 10A and 10B are views illustrating the generation of an accumulated parity in the second implementation example of the embodiment. FIGS. 11A and 11B are views illustrating the recovery of data using an accumulated parity in the second implementation example of the embodiment.

FIG. 9 illustrates an example where storage areas are determined in accordance with four accumulated parities, for the entire storage areas of the nonvolatile memory 20. The entire storage areas of the nonvolatile memory 20 include a plurality of storage areas $M_{11}$ and $M_{15}$ that correspond to a first accumulated parity, a plurality of storage areas $M_{12}$ and $M_{16}$ that correspond to a second accumulated parity, a plurality of storage areas $M_{13}$ and $M_{17}$ that correspond to a third accumulated parity, and a plurality of storage areas $M_{14}$ and $M_{18}$ that correspond to a fourth accumulated parity. When a storage area group including the storage areas $M_{11}$ and $M_{15}$ is defined as GR11, a storage area group including the storage areas $M_{12}$ and $M_{16}$ is defined as GR12, a storage area group including the storage areas $M_{13}$ and $M_{17}$ is defined as GR13, and a storage area group including the storage areas $M_{14}$ and $M_{18}$ is defined as GR14, the storage area group GR11 corresponds to the first accumulated parity, the storage area group GR12 corresponds to the second accumulated parity, the storage area group GR13 corresponds to the third accumulated parity, and the storage area group GR14 corresponds to the fourth accumulated parity.

The plurality of storage areas $M_{11}$ and $M_{15}$ of the storage area group GR11, the plurality of storage areas $M_{12}$ and $M_{16}$ of the storage area group GR12, the plurality of storage areas $M_{13}$ and $M_{17}$ of the storage area group GR13, and the plurality of storage areas $M_{14}$ and $M_{18}$ of the storage area group GR14 are arranged to be dispersed from each other. The storage area $M_{15}$ is physically disposed between the storage areas $M_{12}$ to $M_{14}$ and the storage areas $M_{16}$ to $M_{18}$. The storage areas $M_{12}$ and $M_{16}$ are arranged to be dispersed between the storage areas $M_{11}$ and the storage areas $M_{13}$ to $M_{15}$ and between the storage areas $M_{13}$ to $M_{15}$ and the storage areas $M_{17}$ and $M_{18}$. The storage areas $M_{13}$ and $M_{17}$ are arranged to be physically dispersed between the storage areas $M_{11}$ and $M_{12}$ and the storage areas $M_{14}$ to $M_{16}$ and between the storage areas $M_{14}$ to $M_{16}$ and the storage area $M_{18}$. The storage area $M_{14}$ is physically disposed between the storage areas $M_{11}$ to $M_{13}$ and the storage areas $M_{15}$ to $M_{18}$.

As a result, when an erasure error occurs in a plurality of adjacent frames, the number of storage areas of each storage area group that are affected by the erasure error may be reduced.

In the configuration illustrated in FIG. 9, the generation of an accumulated parity may be performed as illustrated in FIGS. 10A and 10B. FIGS. 10A and 10B are views illustrating the generation of the accumulated parity in the second implementation example.

For example, for the storage area group GR11, as illustrated in FIG. 10A, when data to be stored into the storage areas $M_{11}$ and $M_{15}$ are stored on the data buffer 12b, the encoder 17 performs an encoding operation on each of the data to be stored into the storage areas $M_{11}$ and $M_{15}$, and generates intermediate parities P'P', based on an instruction from the control unit 11. The encoder 17 stores the generated intermediate parities P'P' into the parity storage area 12a. Further, the memory I/F 13 stores the data on the data buffer 12b, into the storage area $M_{11}$.

Subsequently, as illustrated in FIG. 10B, the encoder 17 integrates the intermediate parities P'P' of the storage areas $M_{11}$ and $M_{15}$, and generates an accumulated parity PP. The encoder 17 performs a predetermined operation on the intermediate parities P'P' of the storage areas $M_{11}$ and $M_{15}$, to generate the accumulated parity PP. The predetermined operation is, for example, exclusive OR. The encoder 17 stores the generated accumulated parity PP into the parity storage area 12a. The encoder 17 supplies the data on the data buffer 12b and the accumulated parity PP on the parity storage area 12a, to the memory I/F 13. The memory I/F 13 stores the data and the accumulated parity PP in the storage area $M_{15}$ of the nonvolatile memory 20. The accumulated parity PP may be stored in the last portion (e.g., the last two frames) of the storage area $M_{15}$.

Then, the control unit 11 discards the accumulated parity PP and the intermediate parities P'P' of the storage areas $M_{11}$ and $M_{15}$, which are stored in the parity storage area 12a.

In addition, the generation of an accumulated parity for each of the storage area groups GR12, GR13, and GR14 may be performed in the same manner as illustrated in FIGS. 10A and 10B.

In the configuration illustrated in FIG. 9, the recovery of data using the accumulated parity may be performed as illustrated in FIGS. 11A and 11B. FIGS. 11A and 11B are views illustrating the recovery of data using the accumulated parity in the second implementation example.

For example, descriptions will be made assuming a case where an erasure error occurs in two word lines indicated by an oblique hatching in FIG. 11A.

At this time, for the storage area group GR11, the data of the storage area $M_{15}$ of the storage areas $M_{11}$ and $M_{15}$ corresponding to the accumulated parity PP is correct whereas an erasure error is occurring in the obliquely hatched portion of the storage area $M_{11}$. Based on an instruction from the control unit 11, the decoder 18 detects that the erasure error is occurring in the obliquely hatched portion of the storage area $M_{11}$.

As illustrated in FIG. 11A, the decoder 18 performs an encoding operation for an error correction process on the data read from the storage area $M_{15}$ that is not affected by the erasure error, and regenerates the intermediate parity P'P' of the storage area $M_{15}$. The decoder 18 reads the accumulated parity PP from the storage area $M_{15}$.

As illustrated in FIG. 11B, the decoder 18 recovers the intermediate parity P'P' of the storage area $M_{11}$ according to the intermediate parities P'P' of the storage area $M_{15}$ and the accumulated parity PP. The decoder 18 recovers the intermediate parity P'P' of the storage area $M_{11}$, by performing an inverse operation of the predetermined operation that was performed at the time of generating the accumulated parity PP. The decoder 18 corrects the data of the obliquely hatched portion of the storage area $M_{11}$, using the recovered intermediate parity P'P'. As a result, it is possible to deal with the erasure error in the storage area $M_{11}$ of the plurality of storage areas $M_{11}$ and $M_{15}$.

In addition, the recovery of data using an accumulated parity for each of the storage area groups GR12 to GR14 may be performed in the same manner as illustrated in FIGS. 11A and 11B.

That is, it is possible to deal with a large-scale erasure error, by storing in the nonvolatile memory 20 the accumulated parity PP having the bit length shorter than the sum of the bit lengths of the intermediate parities P'P' of the plurality of storage areas, so that the ability to deal with an erasure error may be improved while reducing the OP consumption ratio.

In FIGS. 10A, 10B, 11A, and 11B, the bit length of the accumulated parity is two frames, and the storage capacity of each of the storage area groups GR11 to GR14 is calculated as 32×2×2=128 frames. Thus, the OP consumption ratio of each of the storage area groups GR11 and GR14 may be expressed in Equation 5 below.

OP consumption ratio=2/128=1.5625(%)     Equation 5

As described above, in the second implementation example, it is possible to perform a two-word-line-failure countermeasure using an accumulated parity, and the OP consumption ratio for the entire storage areas of the nonvolatile memory 20 may be reduced to the value expressed in Equation 5.

Figure 12A:
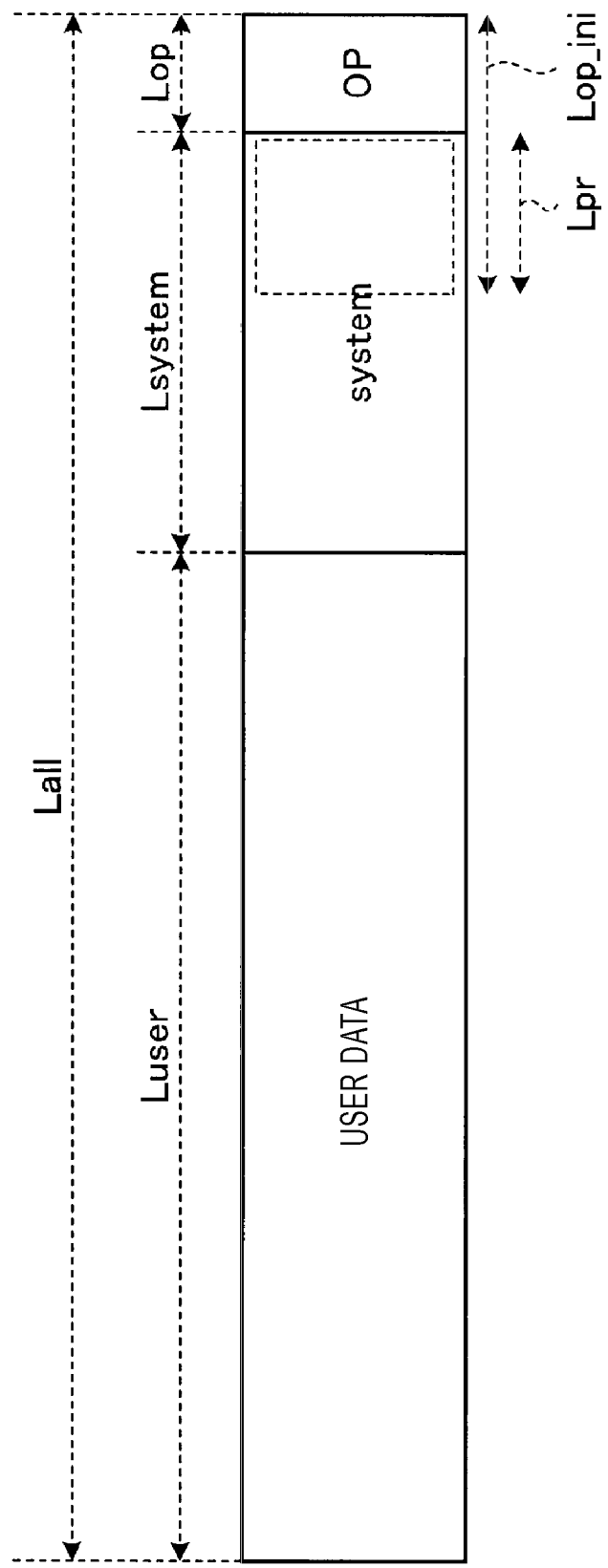
FIGS. 12A and 12B are views illustrating an increase of an OP (over provisioning) ratio in the embodiment.
Figure 12B:
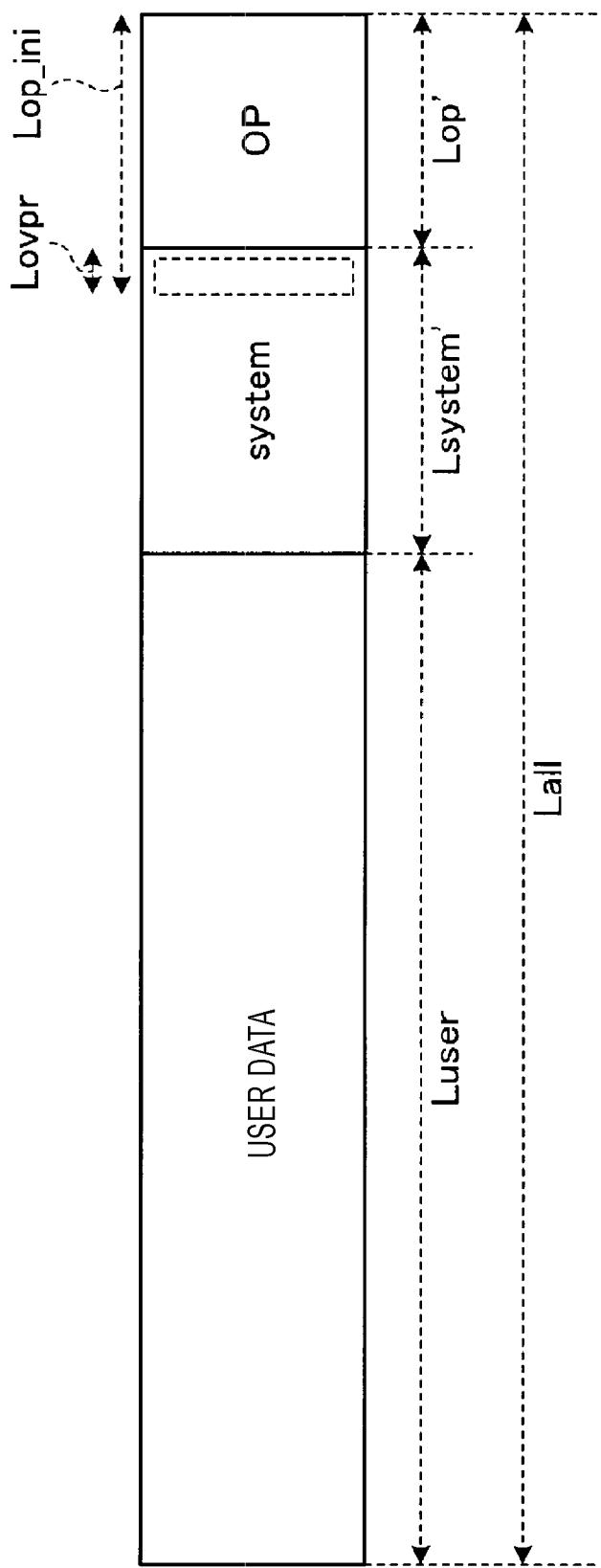
Figure 13A:
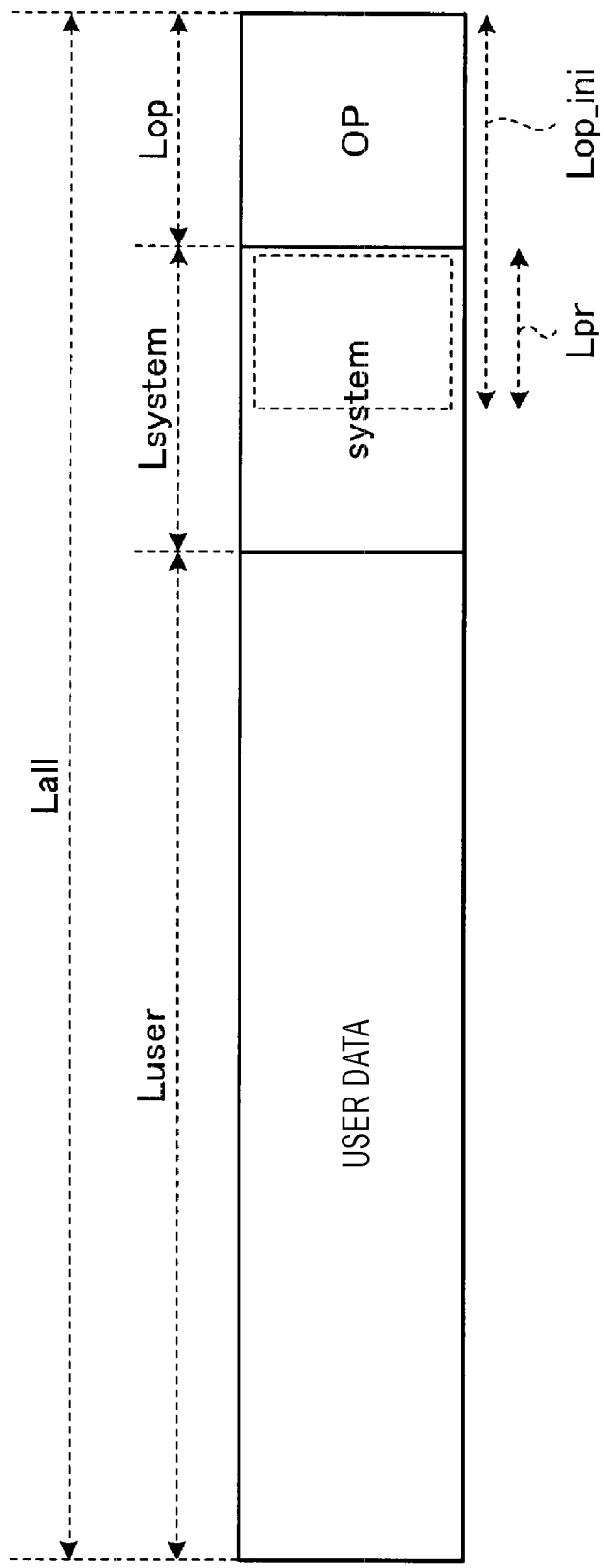
FIGS. 13A and 13B are views illustrating a decrease in the minimum number of blocks in the embodiment.
Figure 13B:
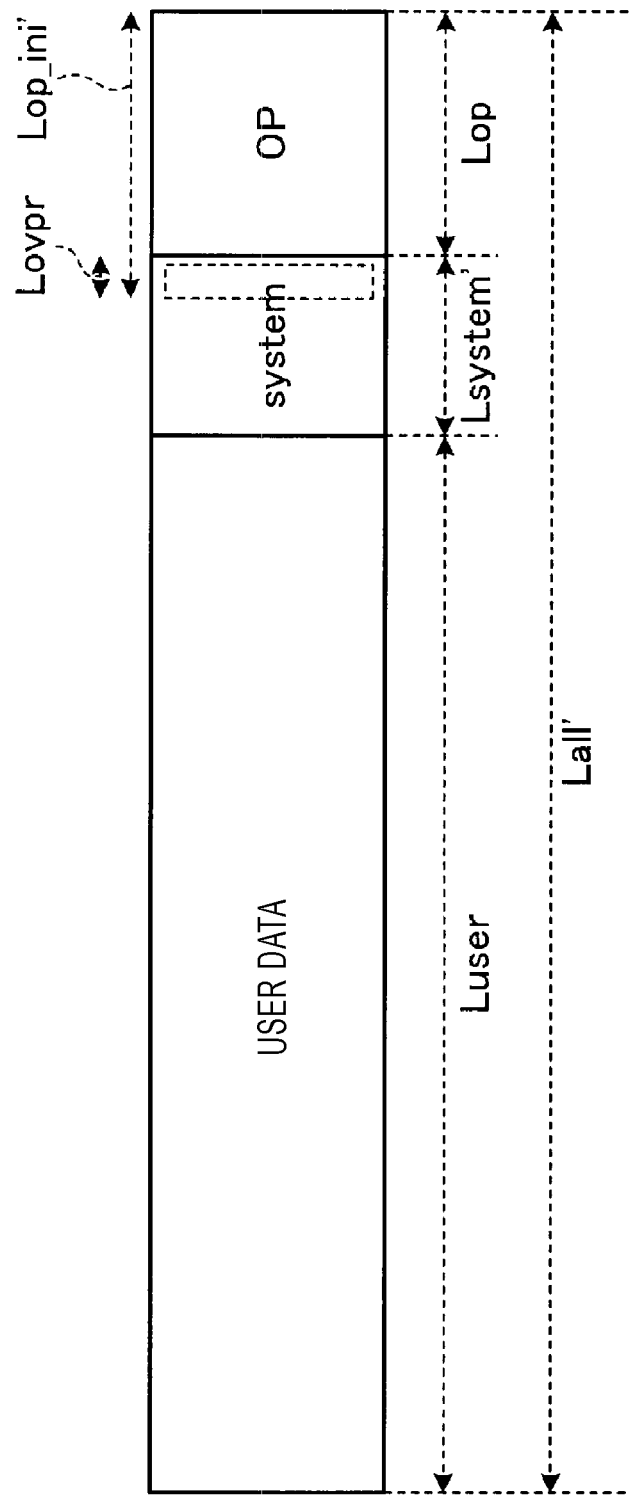

Next, the reduction in the OP consumption ratio will be described with reference to FIGS. 12A, 12B, 13A, and 13B. FIGS. 12A and 12B are views illustrating an increase of the OP ratio by the accumulated parity when the minimum number of blocks is constant. FIGS. 13A and 13B are views illustrating a reduction in the minimum number of blocks by the accumulated parity when the OP ratio is constant.

when it is attempted to perform a correction of a large-scale loss using a normal parity, it is assumed that the consumption capacity by the parity is represented as surrounded by the dashed line in FIG. 12A, and the storage capacity in the entire storage of the nonvolatile memory 20 is configured as represented by the bar graph in FIG. 12A. In the bar graph, the horizontal axis represents the size of the storage capacity. When the capacity of the user data area in the entire storage of the nonvolatile memory 20 is $L_{user}$, the capacity of the system area (management information storage area) is $L_{system}$, and the capacity of the OP area (spare area) is $L_{op}$, the sum of the capacities becomes the storage capacity of the entire storage $L_{all}$. The capacity of the OP area $L_{op}$ is obtained by subtracting the consumption capacity by the parity $L_{pr}$ from the capacity of the OP area at the time of system design $L_{op\_ini}$.

Meanwhile, when it is attempted to perform a correction of a large-scale loss using the accumulated parity in a state where the minimum number of blocks is kept constant, the consumption capacity by the parity $L_{ovpr}$ is represented as surrounded by the dashed line in FIG. 12B, and becomes smaller than the case illustrated in FIG. 12A. That is, the OP consumption ratio is reduced by using the accumulated parity as expressed in Equation 6 below.

$$L_{ovpr} < L_{pr} \qquad \text{Equation 6}$$

According to Equation 6, the capacity of the OP area $L_{op}'$ which is obtained by subtracting the consumption capacity by the parity $L_{ovpr}$ from the capacity of the OP area at the time of system design $L_{op\_ini}$ is secured larger than the case illustrated in FIG. 12A. That is, the relationship represented in Equation 7 below is established.

$$L_{op}'(=L_{op\_ini}-L_{ovpr}) > L_{op}(=L_{op\_ini}-L_{pr}) \qquad \text{Equation 7}$$

According to Equation 7, the OP ratio $L_{op}'/L_{all}$ increases as compared with the case illustrated in FIG. 12A. That is, the relationship represented in Equation 8 below is established.

$$L_{op}'/L_{all} > L_{op}/L_{all} \qquad \text{Equation 8}$$

As represented in Equation 8, when the minimum number of blocks is constant (that is, $L_{all}$ is constant), the OP ratio may be increased by performing an erasure correction measure using an accumulated parity.

Or, when it is attempted to perform a correction of a large-scale loss using a normal parity, it is assumed that the consumption capacity by the parity is represented as surrounded by the dashed line in FIG. 13A, and the storage capacity in the entire storage of the nonvolatile memory 20 is configured as represented by the bar graph in FIG. 13A. In the bar graph, the horizontal axis represents the size of the storage capacity. When the capacity of the user data area in the entire storage of the nonvolatile memory 20 is $L_{user}$, the capacity of the system area (management information storage area) is $L_{system}$, and the capacity of the OP area (spare area) is $L_{op}$, the sum of the capacities becomes the storage capacity of the entire storage $L_{all}$. The capacity of the OP area $L_{op}$ is obtained by subtracting the consumption capacity by the parity $L_{pr}$ from the capacity of the OP area at the time of system design $L_{op\_ini}$.

Meanwhile, when it is attempted to perform a correction of a large-scale loss using an accumulated parity in a state where the OP ratio is kept constant, the consumption capacity by the parity $L_{ovpr}$ is represented as surrounded by the dashed line in FIG. 13B, and becomes smaller than the case illustrated in FIG. 13A. That is, the OP consumption ratio is reduced by using the accumulated parity as expressed in Equation 9 below.

$$L_{ovpr} < L_{pr} \qquad \text{Equation 9}$$

According to Equation 9, the capacity of the OP area at the time of system design $L_{op\_ini}'$ $(=L_{ovpr}+L_{op})$ becomes smaller than the case illustrated in FIG. 13A. Further, the capacity of the system area $L_{system}'$ that includes the consumption capacity by the parity $L_{ovpr}$ becomes smaller than the case illustrated in FIG. 13A. That is, the relationship represented in Equation 10 below is established.

$$L_{system}' < L_{system} \qquad \text{Equation 10}$$

According to Equation 10, the storage capacity of the entire storage $L_{all}'$ becomes smaller than the case illustrated in FIG. 13A. That is, the relationship represented in Equation 11 below is established.

$$L_{all}'(=L_{user}+L_{system}'+L_{op}) < L_{all}(=L_{user}+L_{system}+L_{op}) \qquad \text{Equation 11}$$

As represented in Equation 11, when the OP ratio $(=L_{op}/L_{user})$ is constant, the storage capacity of the entire storage may be reduced, and the minimum number of blocks may be reduced, by performing word-line(s)-failure countermeasure using the accumulated parity.

As described above, according to the embodiment, in the memory system 1, an accumulated parity is obtained by integrating a plurality of intermediate parities, and stored in the nonvolatile memory 20. As a result, the ability to deal with an erasure error may be improved while reducing the OP consumption ratio. Thus, the reliability of data stored in the nonvolatile memory 20 may be efficiently improved.

Further, the location where the accumulated parity is stored in the nonvolatile memory 20 is not limited to any one of the plurality of storage areas that correspond to the accumulated parity, and the accumulated parity may be stored in any area in the nonvolatile memory 20. For example, a dedicated storage area may be provided in the nonvolatile memory 20, and the controller 10 may store the accumulated parity in the dedicated storage area.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
  a nonvolatile memory;
  a buffer configured to temporarily store a plurality of data bits to be written to the nonvolatile memory; and a controller configured to:
  write the plurality of data bits, read from the buffer, to the nonvolatile memory;
  write a plurality of intermediate parity bits to the buffer, but not to the nonvolatile memory, wherein each of the plurality of intermediate parity bits is associated with an error correction process on each of the plurality of data bits; and
  write, to the nonvolatile memory, an accumulated parity bit that is an integration of the plurality of intermediate parity bits.

2. The memory system according to claim 1, wherein the controller is configured to discard the plurality of intermediate parity bits when writing the plurality of data bits corresponding to the accumulated parity bit to the nonvolatile memory is determined to be successful.

3. The memory system according to claim 2, wherein the controller is configured to generate the plurality of intermediate parity bits by performing an encoding operation for the error correction process on each of the plurality of data bits, and generate the accumulated parity bit by performing a predetermined operation on the plurality of generated intermediate parity bits.

4. The memory system according to claim 3, wherein the plurality of data bits include a plurality of first data bits and a plurality of second data bits,
  the plurality of intermediate parity bits include a plurality of first intermediate parity bits that correspond to the plurality of first data bits, and a second intermediate parity bit that corresponds to the second data bits, and wherein
  the controller is configured to:
    read the accumulated parity bit from the nonvolatile memory;
    read the plurality of first data bits from the nonvolatile memory;
    perform the encoding operation for the error correction process on the plurality of first data bits to generate the plurality of first intermediate parity bits;
    read the second data from the nonvolatile memory;
    generate the second intermediate parity bit on the basis of the plurality of first intermediate parity bits and the accumulated parity bit; and
    correct the second data bit using the second intermediate parity bit.

5. The memory system according to claim 3, wherein the predetermined operation is an exclusive OR or an encoding operation for an error correction process.

6. The memory system according to claim 1, wherein a bit length of the accumulated parity bit is shorter than a sum of respective bit lengths of the plurality of intermediate parity bits.

7. The memory system according to claim 1, wherein the plurality of data bits are stored in respective areas in the nonvolatile memory that are arranged to be physically dispersed from each other.

8. A method of operating a memory system, the method comprising:
  writing a plurality of data bits temporarily stored in a buffer, to a nonvolatile memory;
  writing a plurality of intermediate parity bits to the buffer but not to the nonvolatile memory, each of the plurality of intermediate parity bits associated with an error correction process on each of the plurality of data bits; and
  writing, to the nonvolatile memory, an accumulated parity bit that is an integration of the plurality of intermediate parity bits.

9. The method according to claim 8, further comprising:
  discarding the plurality of intermediate parity bits when writing the plurality of data bits corresponding to the accumulated parity bit to the nonvolatile memory is successful.

10. The method according to claim 8, further comprising:
  generating the plurality of intermediate parity bits by performing an encoding operation for the error correction process on each of the plurality of data bits; and
  generating the accumulated parity bit by performing a predetermined operation on the plurality of generated intermediate parity bits.

11. The method according to claim 10, wherein the plurality of data bits include a plurality of first data bits and a second data bit,
  the plurality of intermediate parity bits include a plurality of first intermediate parity bits that correspond to the plurality of first data bits, and a second intermediate parity bit that corresponds to the second data bit, the method further comprises:
    reading the accumulated parity bit from the nonvolatile memory;
    reading the plurality of first data bits from the nonvolatile memory;
    performing the encoding operation for the error correction process on the plurality of first data bits to generate the plurality of first intermediate parity bits;
    reading the second data bit from the nonvolatile memory;
    generating the second intermediate parity bit on the basis of the plurality of first intermediate parity bits and the accumulated parity bit; and
    correcting the second data bit using the second intermediate parity bit.

12. The method according to claim 10, wherein the predetermined operation is exclusive OR or an encoding operation for an error correction process.

13. The method according to claim 8, wherein a bit length of the accumulated parity bit is shorter than a sum of respective bit lengths of the plurality of intermediate parity bits.

14. The method according to claim 8, wherein the plurality of data bits are stored in respective areas in the nonvolatile memory that are arranged to be physically dispersed from each other.

15. A memory system connectable to a host comprising:
  a nonvolatile memory; and
  a controller configured to:
    write the plurality of data bits received from the host and not yet been written to the nonvolatile memory, to the nonvolatile memory;
    generate a plurality of intermediate parity bits, wherein each of the plurality of intermediate parity bits is associated with an error correction process on each of the plurality of data bits; and
    write, to the nonvolatile memory, not the plurality of intermediate parity bits but an accumulated parity bit that is an integration of the plurality of intermediate parity bits.

16. The memory system according to claim 15, wherein the controller is configured to discard the plurality of intermediate parity bits when writing the plurality of data bits corresponding to the accumulated parity bit to the nonvolatile memory is determined to be successful.

17. The memory system according to claim 16, wherein the controller is configured to generate the plurality of intermediate parity bits by performing an encoding operation for the error correction process on each of the plurality of data bits, and generate the accumulated parity bit by performing a predetermined operation on the plurality of generated intermediate parity bits.

18. The memory system according to claim 17, wherein the plurality of data bits include a plurality of first data bits and a plurality of second data bits, the plurality of intermediate parity bits include a plurality of first intermediate parity bits that correspond to the plurality of first data bits, and a second intermediate parity bit that corresponds to the second data bits, and wherein the controller is configured to:

read the accumulated parity bit from the nonvolatile memory;

read the plurality of first data bits from the nonvolatile memory;

perform the encoding operation for the error correction process on the plurality of first data bits to generate the plurality of first intermediate parity bits;

read the second data from the nonvolatile memory;

generate the second intermediate parity bit on the basis of the plurality of first intermediate parity bits and the accumulated parity bit; and correct the second data bit using the second intermediate parity bit.

19. The memory system according to claim 17, wherein the predetermined operation is an exclusive OR or an encoding operation for an error correction process.

20. The memory system according to claim 15, wherein a bit length of the accumulated parity bit is shorter than a sum of respective bit lengths of the plurality of intermediate parity bits.

* * * * *